(12) United States Patent
Zhang et al.

(10) Patent No.: US 12,128,624 B2
(45) Date of Patent: Oct. 29, 2024

(54) HYDRAULIC 3D-PRINTING SYSTEM AND METHOD

(71) Applicant: SprintRay, Inc., Los Angeles, CA (US)

(72) Inventors: Jing Zhang, Los Angeles, CA (US); Dongjian Wang, Zhejiang (CN); Zhongyu Gao, Zhejiang (CN); Biqing Lu, Guangdong (CN); Yubing Ding, Zhejiang (CN)

(73) Assignee: SprintRay, Inc., Los Angeles, CA (US)

( * ) Notice: Subject to any disclaimer, the term of this patent is extended or adjusted under 35 U.S.C. 154(b) by 12 days.

(21) Appl. No.: 18/198,257

(22) Filed: May 16, 2023

(65) Prior Publication Data

US 2024/0198591 A1    Jun. 20, 2024

Related U.S. Application Data

(60) Provisional application No. 63/433,185, filed on Dec. 16, 2022.

(51) Int. Cl.
| | |
|---|---|
| *B29C 64/321* | (2017.01) |
| *B29C 64/124* | (2017.01) |
| *B33Y 10/00* | (2015.01) |
| *B33Y 40/00* | (2020.01) |

(52) U.S. Cl.
CPC .......... *B29C 64/321* (2017.08); *B29C 64/124* (2017.08); *B33Y 10/00* (2014.12); *B33Y 40/00* (2014.12)

(58) Field of Classification Search
CPC ... B29C 64/124; B29C 64/129; B29C 64/135; B29C 64/245; B29C 64/255; B29C 64/321; B29C 64/329; B29C 64/336; B33Y 30/00; B33Y 10/00; B33Y 40/00

See application file for complete search history.

(56) References Cited

U.S. PATENT DOCUMENTS

| | | |
|---|---|---|
| 7,195,472 B2 | 3/2007 | John |
| 9,360,757 B2 | 6/2016 | DeSimone et al. |
| 10,766,243 B2 | 9/2020 | Costabeber |
| 11,458,672 B2 | 10/2022 | John |
| 2020/0398490 A1 | 12/2020 | Schmid et al. |
| 2021/0122104 A1* | 4/2021 | Holt ............... B29C 64/291 |
| 2021/0146616 A1 | 5/2021 | Mansouri et al. |
| 2021/0291453 A1* | 9/2021 | Kong ............... B22F 12/50 |
| 2022/0032539 A1 | 2/2022 | Stadlmann |

FOREIGN PATENT DOCUMENTS

CN    111844730 B    10/2020

\* cited by examiner

*Primary Examiner* — Jamel M Nelson
(74) *Attorney, Agent, or Firm* — JAFARI LAW GROUP, INC.

(57) ABSTRACT

The invention is a system and method for printing 3D objects that employs a hydraulic device. The device may include a piston, a platform, multiple chambers, and a channel, wherein the channel and chambers are fluidly connected and configured to hold a desired amount of 3D printing material suitable for 3D-printing objects for a wide range of applications. In an exemplary method, moving the piston transfers 3D printing material from one chamber to another chamber in which a build platform is situated; radiation from a light engine coupled to the chamber that includes the platform exposes the 3D printing material to a curing light on a surface of the platform. In exemplary embodiments, the chambers may be designed just small enough so as to facilitate the printing of a single small 3D-printed object.

11 Claims, 20 Drawing Sheets

Begin

End

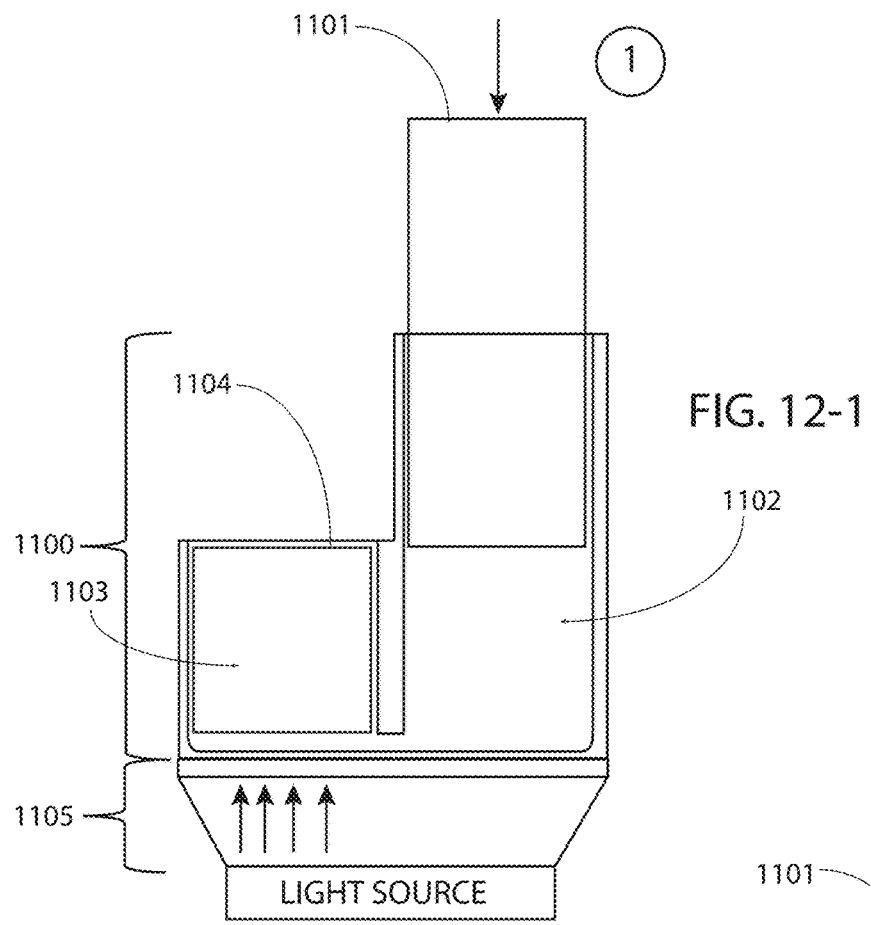
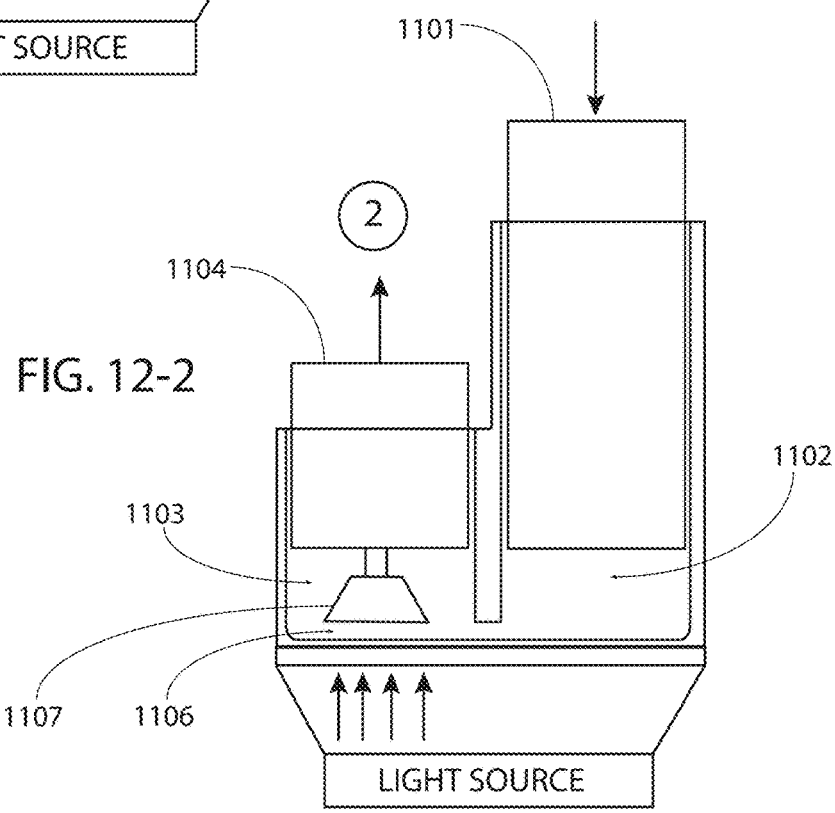

FIG. 13-3
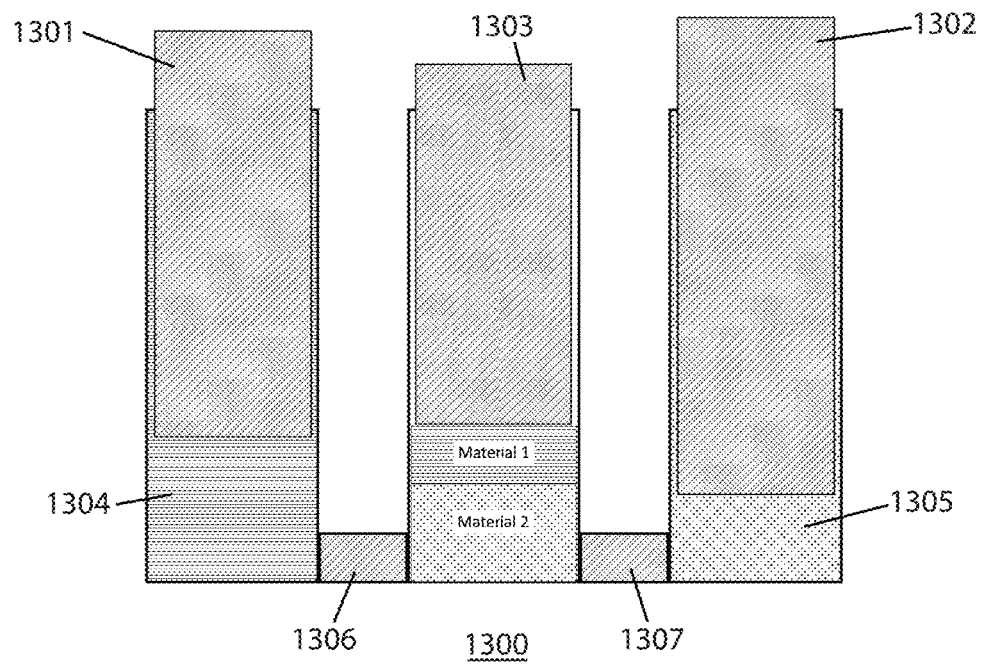
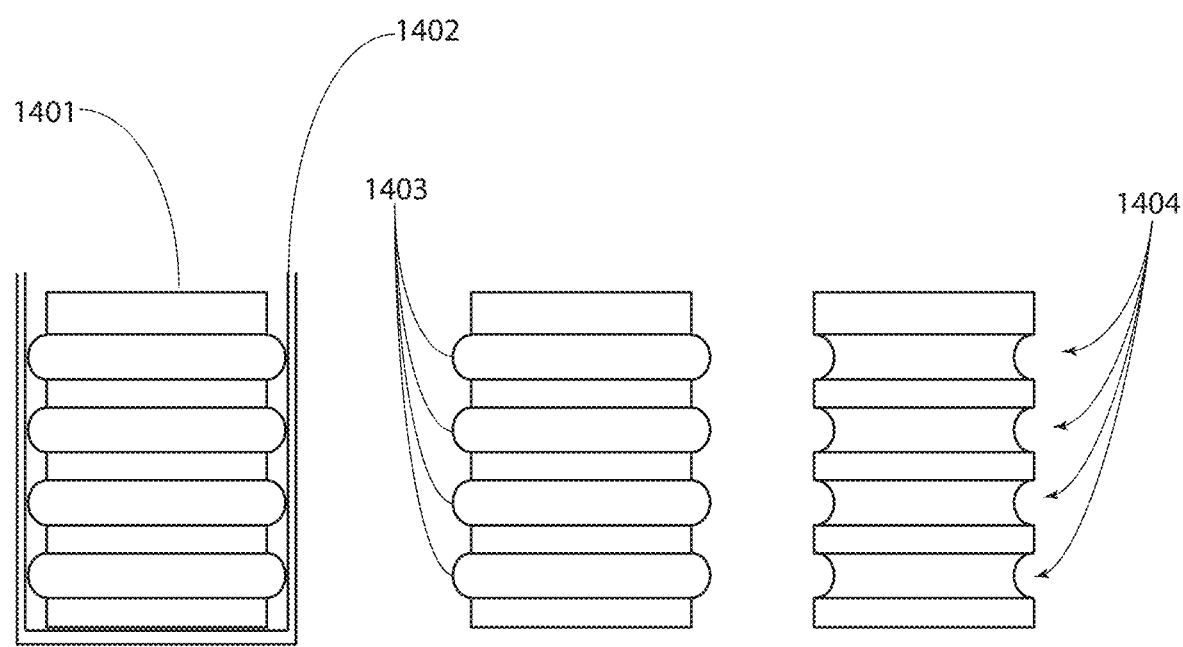
FIG. 14  FIG. 15  FIG. 16

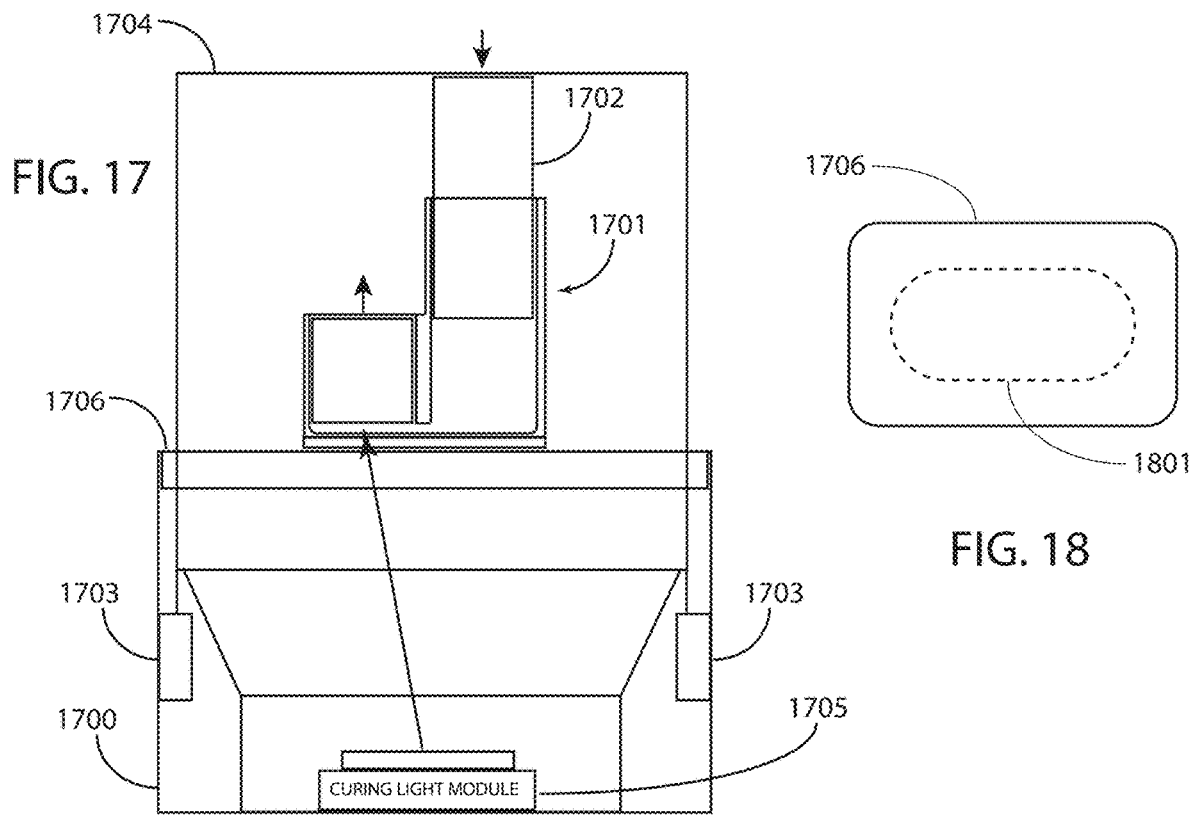
FIG. 17
FIG. 18
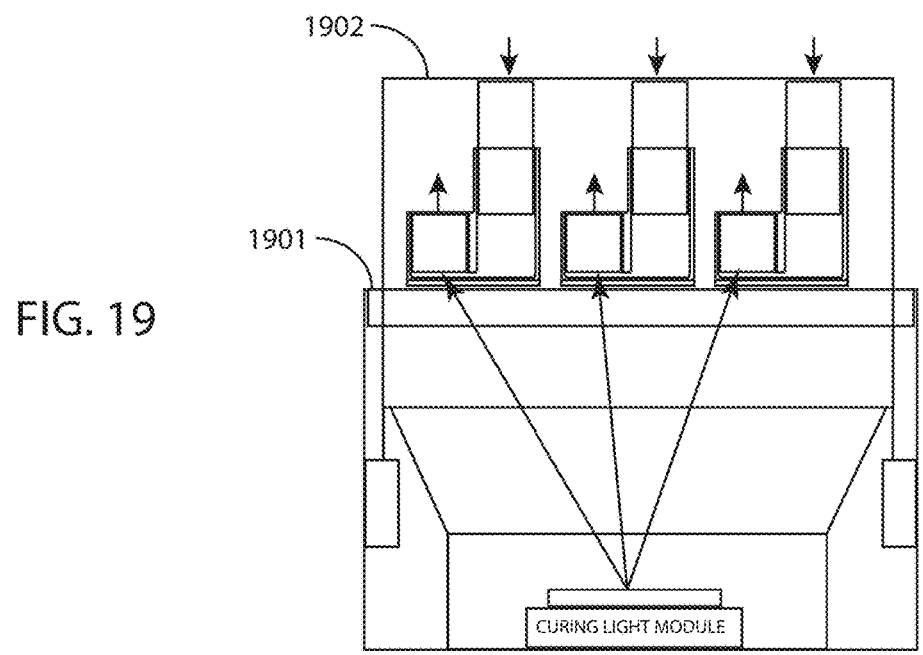
FIG. 19

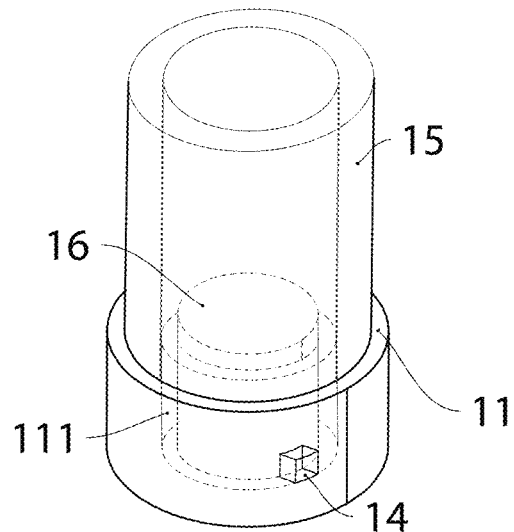
FIG. 24-1
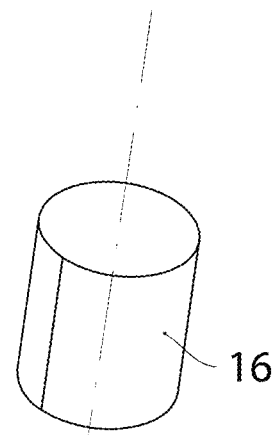
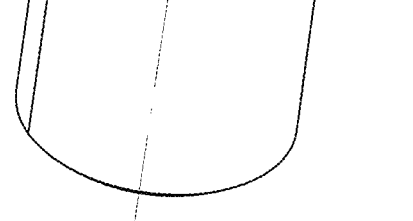
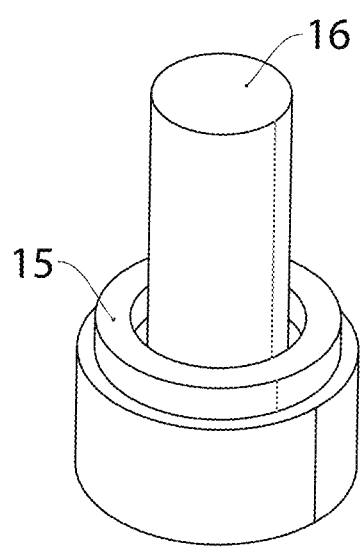
FIG. 24-3
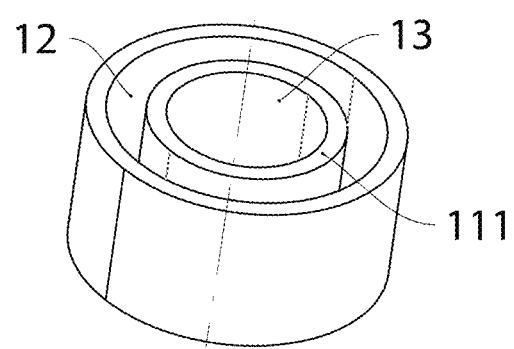
FIG. 24-2

B-B

HYDRAULIC 3D-PRINTING SYSTEM AND METHOD

PRIORITY AND RELATED APPLICATIONS

This application claims priority to U.S. Provisional Application No. 63/433,185, filed on Dec. 16, 2022, the disclosure of which is incorporated by reference in its entirety.

TECHNICAL FIELD OF THE INVENTION

The present invention relates generally to additive manufacturing methods using three-dimensional (3D) printers. More specifically, the invention involves a system and method for printing 3D objects that employs hydraulic principles to efficiently build 3D-printed objects.

BACKGROUND OF THE INVENTION

Traditionally, the size of a printing material tank is designed as large as possible, so that the 3D printer may print a variety size of objects or print as many objects as possible during a single printing job. However, for some users (e.g., dentists or dental professionals), large tanks are not desirable, particularly when only a single object, typically a small object, is the subject of the print job. For example, for a dental professional, a large tank may not be desirable for printing a 3D-printed crown. There are multiple reasons for desiring a smaller tank when the printing job involves a small object, including but not limited to: the desire to maximize use of resources such as resin or printing material that may go wasted; avoiding time wasted by cleaning of the large tank between uses; having to change resin types between jobs that may be typically custom jobs; avoiding human error that naturally results from having to change and manually maintain large resin tanks; the shorten lifespan of resin that is poured into the tank but not immediately used, etc. Thus, there is clearly a need for a system and method that obviates the problems or obstacles that arise when desiring to print small, particularly customized, 3D printed objects.

By way of an example and for illustration purposes, SprintRay currently has printing devices that typically include a large size resin tank and a build platform. Before printing, a user needs to add a certain volume of resin into the resin tank. During the printing process, resin is cured on the bottom of build platform by radiation, and thus a 3D object is formed. See for example, FIG. 1 illustrating SprintRay's ProS resin tank, embodiments of which are described in U.S. Patent Application Publication No. 20210146616A1.

However, if the user wants to print a small object, for example a 3D object such as a dental crown, due to the limitations of the size of the resin tank, the user will nonetheless be required to add an unnecessary volume of resin into the tank; in fact, with a small object such as a dental crown, most of the resin in the tank will not be used, will not be cured into a layer or part of the intended object, and thus will be wasted. At the same time, the remaining resin or printing material that was typically poured into the tank, will be degraded by virtue of its exposure to air; that is any remaining printing material that was not used will have lost freshness, which will necessarily affect the freshness of the printing material for subsequent use, and possibly the quality of objects printed during subsequent jobs. This is in art because generally resin is used to fill in the bottom of the resin tank, and continuously replenish between the build platform and the resin tank after each layer of the target 3D object is printed.

By way of further example, in certain traditional printing devices that utilize a printing material or resin tank, the tanks are generally required to be filled with about 1000 ml of resin in order to print a dental crown. Yet, during the printing process, only about ~1 ml to ~2 ml of resin may actually be used or rather cured to build the dental crown. Accordingly, as little as less than 1% of the resin in a traditional tank may be used when printing small objects. Although the remaining resin may be recycled, the recycling process affects its freshness and adequacy for future use. Not only is this very inconvenient, but when resin is continuously exposed to air, water molecules from air may in a way contaminate the resin, resulting in a decrease in quality, that of course translates to a decrease in the performance of the cured 3D object. Moreover, it's worth noting that due to resin being exposed to air even during the printing process, humidity and dust in the air may also influence the accuracy of cured 3D objects. For the same reason, particularly when printing a small 3D object, a large size resin tank and a large size build platform will lead to more resin waste, less effective 3D printed parts, with limited performance and durability.

Another common problem, including particularly in the field of dentistry, concerns the materials typically required for certain printing jobs. For example, an artificial crown may generally require higher performance than other components or parts, thus the printing material of forming the artificial crown usually requires high-viscosity resin, so as to ensure the bending strength, flexural modulus, rigidity, service life, etc. However, high-viscosity resin may not be suitable for existing 3D printers (e.g., bottom-up printers). Traditionally, in bottom-up printers, while curing each layer of the object, a build platform descends to a certain position, which make the thickness of resin between the bottom of resin tank and the lower surface of build platform is equal to a layer of object. Nevertheless, there would be tremendous fluid force between the resin and the build platform due to the high-viscosity of the resin and the large-size limitation of the build platform; that is, the fluid force may greatly limit the downward movement of build platform, so that the build platform may not descend to the required position in the predetermined time period, especially while printing the initial layer. Accordingly, because the build platform cannot descend to the predetermined position, the thickness of resin between the bottom of resin tank and the lower surface of build platform will be thicker than the predetermined layer of object, thus the layer of resin will not cure adequately, especially the portion of the layer adjacent to the build platform. Further, the layer that is not adequately cured will prevent an initial layer of the resin from adhering to the lower surface of the build platform; in this way, the print will fail. To address these issues with high-viscosity resin required for some builds, there are specialized tanks adapted for a highly viscous printing material. For example, a tank such as described in SprintRay's U.S. patent Ser. No. 11/155,028, and U.S. Patent Application Publication US20220024117A1.

Again, the problem arises when wanting to switch between small jobs that may require one type of printing material, to another job that requires another type of printing material. The practitioner (in the dental setting), or the user desiring to print several jobs may find themselves cleaning out resin tanks between jobs, changing resin tanks, adding or switching printing materials between jobs, or switching printing machines altogether.

Accordingly, there is a need that has not been adequately addressed by the prior art, and it is to these ends that the present invention has been developed.

SUMMARY OF THE INVENTION

The invention is generally a 3D printing system and method that employs a hydraulic device configured to facilitate efficiently building 3D-printed objects.

Various aspects of the present invention involve methods, systems, and devices for printing or forming 3D objects using principals in fluid mechanics, for example hydraulics, to optimize the efficiency and quality of the products built using these methods, systems, and devices.

One aspect of the present invention involves a method for printing a 3D-object. In exemplary embodiments, the method may include the steps of: (a) actuating a piston inside a first chamber, the piston adapted to actuate movement of a platform inside a second chamber in fluid communication with the first chamber; (b) transferring at least a portion of a printing material stored at least partially in the first chamber to the second chamber, the second chamber including a printing area between a surface of a window and the platform; (c) emitting a curing light through the window to cure a layer of the printing material to the platform or to a previously cured layer of the printing material already cured onto the platform; and (d) repeating steps (a)-(c) until a three-dimensional object is formed.

In some exemplary embodiments, actuating the piston inside the first chamber hydraulically actuates the platform. In some exemplary embodiments, actuating the piston inside the first chamber hydraulically actuates a piston in the second chamber, the piston in the second chamber forming at least a portion of the platform.

In some exemplary embodiments, step (a) may include (a-1) moving the piston in a single direction along an axis of the first chamber. In some exemplary embodiments, step (a-1) may include (a-2) continuously moving the piston until the three-dimensional object is formed. In some exemplary embodiments, step (a-1) may include (a-3) pausing movement of the piston at programmable intervals until the three-dimensional object is formed.

In some exemplary embodiments, step (b) may include (b-1) disposing the layer of the printing material on a glass surface of the window. In some exemplary embodiments, step (b) may include (b-2) disposing the layer of the printing material on a film or a coating layer that at least partially forms the window. In some exemplary embodiments, the film may be a flexible oxygen permeation film. In some exemplary embodiments, the film or coating layer may either be a polydimethylsiloxane (PDMS) film, a polymethylpentene (PMP) film, a Transparent Polymer X (TPX) film, or a fluorinated ethylene propylene (FEP) film.

In some exemplary embodiments, step (d) may include (d-1) substantially consuming the printing material stored in the first chamber. In some exemplary embodiments, the method may further include (e) releasing the platform from the second chamber to allow access to the three-dimensional object formed on the platform. In some exemplary embodiments, the method may further include (f) prior to actuating the piston, breaking or removing a seal of a container assembly that houses the first and second chambers.

Another aspect of the present invention involves a system for forming or printing three-dimensional objects. In exemplary embodiments, the system may include: a cartridge or container assembly for holding one or more printing materials to print a three-dimensional object, the container assembly including: a first chamber adapted to store a first printing material; a platform movable inside a second chamber, the second chamber in fluid communication with the first chamber; and a first piston movable inside the first chamber and configured to hydraulically actuate movement of the platform inside the second chamber by transferring at least a portion of the first printing material in the first chamber to a printing area between a surface of a window and the platform in the second chamber. An actuator may be coupled to a controller and configured to move the first piston; and a curing light emitting module, in communication with the controller, may be configured to emit a curing light through the window to cure at least a portion of the layer of the printing material to the platform or to a previously cured layer of the printing material until the three-dimensional object is formed.

In some exemplary embodiments, movement of the piston hydraulically actuates movement of the platform. In some exemplary embodiments, movement of the piston inside the first chamber hydraulically actuates a piston in the second chamber, the piston in the second chamber forming at least a portion of the platform. In some exemplary embodiments, the piston is adapted to move in a single direction along an axis of the first chamber until the three-dimensional object is formed. In some exemplary embodiments, the piston is further adapted to continuously move along the axis of the first chamber until the three-dimensional object is formed. In some exemplary embodiments, the piston is further adapted to pause movement at programmable intervals until the three-dimensional object is formed.

In some exemplary embodiments, the system further includes a film or coating layer disposed over an interior surface of the window. In some exemplary embodiments, the film or coating layer disposed over the interior surface of the window may be one of a polydimethylsiloxane (PDMS) film, a polymethylpentene (PMP) film, a Transparent Polymer X (TPX) film, or a fluorinated ethylene propylene (FEP) film. In some exemplary embodiments, the window comprises a flexible oxygen permeation film.

In some exemplary embodiments, the container assembly houses the first and second chambers. In some exemplary embodiments, the system further includes a removable seal that keeps the first and second chambers airtight. In some exemplary embodiments, the system further includes a removable cover to prevent light from passing through the window of the container assembly.

Yet another aspect of the present invention involves devices, for example a cartridge or container assembly, which holds a printing material used to print a three-dimensional object wherein the container assembly includes a platform adapted to facilitate the building of the 3D object onto the platform inside the container assembly. In some exemplary embodiments, the container assembly may include: a first chamber adapted to store a first printing material; a platform movable inside a second chamber, the second chamber in fluid communication with the first chamber; and a first piston movable inside the first chamber and configured to hydraulically actuate movement of the platform inside the second chamber by transferring at least a portion of the first printing material in the first chamber to the second chamber. The second chamber may include a printing area between a surface of a window and the platform, wherein the window is adapted to receive a curing light for curing a layer of the first printing material onto the platform in order to build a three-dimensional object on the platform.

In some exemplary embodiments, the piston is a first piston, and the platform comprises a surface of a second piston adapted to move inside the second chamber.

In some exemplary embodiments, the container assembly further includes a base including an opening exposing the window. In some exemplary embodiments, the container assembly further includes a film or coating layer disposed over an interior surface of the window. In some exemplary embodiments, the film or coating layer disposed over the interior surface of the window comprises one of: a polydimethylsiloxane (PDMS) film; a polymethylpentene (PMP) film; a Transparent Polymer X (TPX) film; or a fluorinated ethylene propylene (FEP) film. In some exemplary embodiments, the window of the container assembly comprises a flexible oxygen permeation film. In some exemplary embodiments, the flexible oxygen permeation film is adapted to rest against a glass surface of a 3D-printing device configured to support the base of the container assembly.

In some exemplary embodiments, the container assembly may further include a removable seal that keeps the first and second chambers airtight until the seal is removed. In some exemplary embodiments, the container assembly may further include a removable cover to prevent light from passing through the window.

In some exemplary embodiments, the container assembly further includes a third chamber in fluid communication with the second chamber; and a second piston movable inside the third chamber and adapted to hydraulically actuate movement of the platform inside the second chamber by transferring at least a portion of a second printing material stored in the third chamber to the printing area inside the second chamber.

Yet another aspect of the present invention involves a 3D printer or apparatus that employs a hydraulic means for printing three-dimensional objects. The apparatus may include: an actuator adapted to actuate movement of a piston movable inside a container assembly, the container assembly adapted to hold one or more printing materials and to print a three-dimensional object; a base adapted to receive the container assembly; a controller coupled to the actuator; and a curing light emitting module, in communication with the controller, wherein the controller is configured to: (a) actuate movement of the piston inside a first chamber of the container assembly, the piston adapted to hydraulically actuate movement of a platform inside a second chamber in fluid communication with the first chamber; (b) transfer at least a portion of a printing material stored at least partially in the first chamber to the second chamber, the second chamber including a printing area between a surface of a window and the platform; (c) emit a curing light through the window to cure a layer of the printing material to the platform or to a previously cured layer of the printing material already cured onto the platform; and (d) repeat steps (a)-(c) until a three-dimensional object is formed.

In some exemplary embodiments, the container assembly includes a spring that may be released by the controller, for example by actuating the actuator adapted to release the spring; the spring may be adapted to actuate movement of the piston.

In some exemplary embodiments, the actuator is configured to push directly or indirectly on the piston to move the piston inside the chamber of the container assembly. In some exemplary embodiments, the piston hydraulically actuates movement of the platform.

In some exemplary embodiments, the actuator is configured to pull directly or indirectly on the platform. In some exemplary embodiments, movement of the platform hydraulically actuates movement of the piston.

In some exemplary embodiments, releasing the spring actuates movement of the piston, and the controller actuates an actuator configured to pull directly or indirectly on the platform.

Various objects and advantages of the present invention will become apparent from the following description taken in conjunction with the accompanying drawings, wherein are set forth, by way of illustration and example, certain embodiments of the invention. The drawings submitted herewith constitute a part of this specification, include exemplary embodiments of the present invention, and illustrate various objects and features thereof.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIG. 2-1 illustrates a block diagram of a system in accordance with the present invention.

FIG. 2-2 illustrates a block diagram of a device adapted to hold printing material and print a three-dimensional object in accordance with the present invention.

FIG. 2-3 illustrates a block diagram of a system for printing a three-dimensional object in accordance with the present invention.

FIG. 3-1 and FIG. 3-2 illustrate a device and method in accordance with exemplary embodiments of the present invention.

FIG. 12-1-FIG. 12-4 illustrate a method of printing a 3D-printed object performed by a system in accordance with exemplary embodiments of the present invention.

FIG. 13-1 illustrates a method for printing three-dimensional objects in accordance with exemplary embodiments of the present invention.

FIG. 13-2 illustrates a system for printing three-dimensional objects using multiple materials, in accordance with exemplary embodiments of the present invention.

FIG. 13-3 illustrates a system for printing three-dimensional objects using multiple materials, in accordance with exemplary embodiments of the present invention.

FIG. 14-FIG. 16 illustrate several views of a device in accordance with exemplary embodiments of the present invention.

FIG. 17 illustrates a system for printing three-dimensional objects in accordance with exemplary embodiments of the present invention.

FIG. 18 illustrates a container assembly support configured to support or receive a container assembly or cartridge for the system shown in FIG. 17, in accordance with exemplary embodiments of the present invention.

FIG. 19 illustrates a system for printing three-dimensional objects in accordance with exemplary embodiments of the present invention.

FIG. 23-1 through FIG. 23-4 illustrate exemplary embodiments of pistons, and more specifically different shapes of pistons that may be employed in accordance with the present invention.

FIG. 23-5 illustrates exemplary guiding structures that may be employed in accordance with the present invention.

FIG. 24-1 through FIG. 24-3 illustrate a container assembly body configuration in accordance with some exemplary embodiments of the present invention.

FIG. 24-4 through FIG. 24-5 illustrate cross-sectional views of the container assembly body configuration in accordance with the embodiment shown in FIG. 24-1.

FIG. 24-6 through FIG. 24-9 illustrate a container assembly body configuration in accordance with some exemplary embodiments of the present invention.

DETAILED DESCRIPTION OF THE INVENTION

Figure 1:
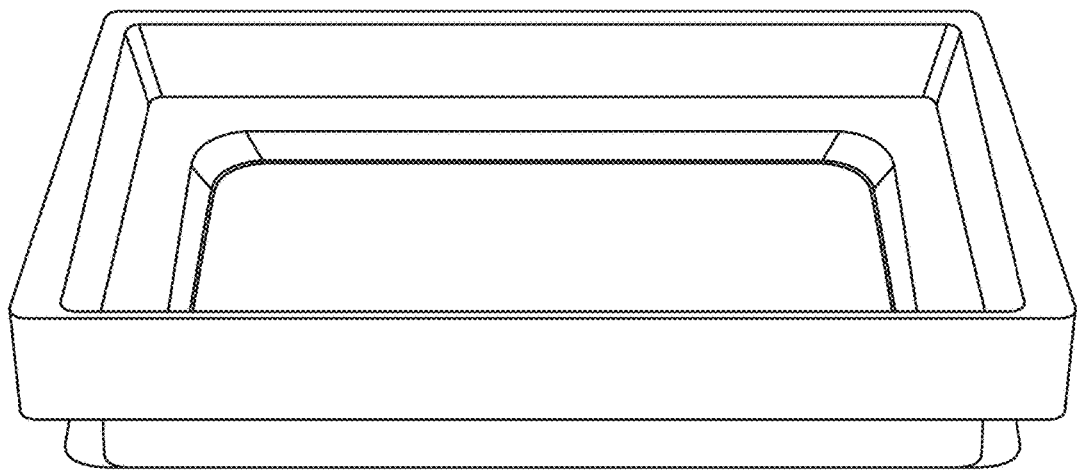
FIG. 1 illustrates prior art resin tank.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

For purposes of this disclosure, the terms "upper", "lower", "right", "left", "rear", "front", "vertical", "horizontal" and derivatives thereof shall relate to the invention as oriented in the figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

As used in this disclosure, the term "comprise" and variations of the term, such as "comprising" and "comprises," are not intended to exclude other additives, components, ingredients or steps.

Figures 1, 2:
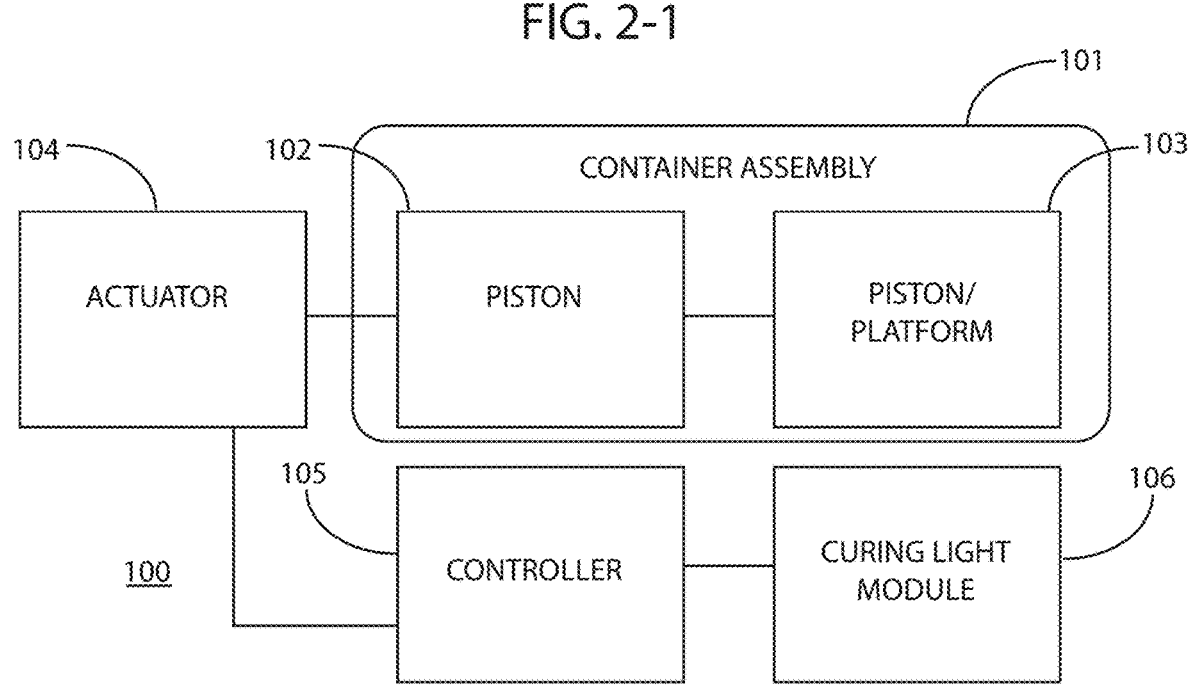
Figure 2:
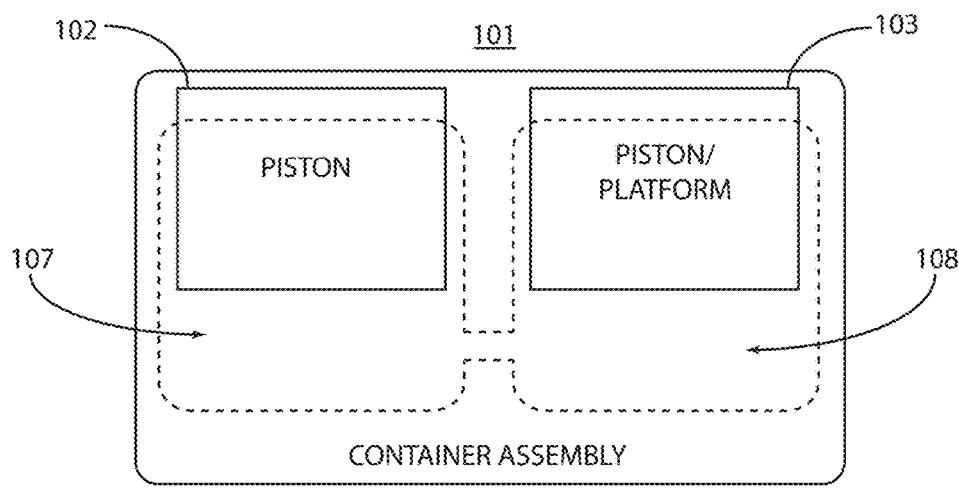

Turning now to the figures depicting embodiments of the invention, FIG. 2-1 illustrates a block diagram of a system in accordance with the present invention. More specifically, FIG. 2-1 depicts system 100, which exemplarily includes a container assembly 101 for holding a printing material to print a three-dimensional object; a piston 102 movable inside a first chamber of the container assembly 101, configured to: actuate movement of a platform 103 inside a second chamber in fluid communication with the first chamber, and transfer at least a portion, for example a layer, of the printing material stored in the first chamber to the second chamber, wherein the second chamber includes a printing area between a surface of a window and the platform 102 inside the second chamber; an actuator 104 coupled to a controller 105 and configured to move the piston; and a curing light module 106, in communication with the controller 105, configured to emit a curing light through the window to cure at least a portion of the layer of the printing material to the platform or to a previously cured layer of the printing material until the three-dimensional object is formed.

Container assembly 101 may be a container or cartridge that is adapted to hold one or more types of printing materials, and adapted to facilitate the building of a 3D object onto a platform 103 that is at least partially housed inside the cartridge or container assembly 101. A piston 102, as will be described in greater detail below, may be adapted to drive a hydraulic transfer of the printing material inside a chamber of the container assembly to a second chamber or printing area between a window and the platform of the container assembly 101.

Actuator 104 may be any type of actuator, or may be an actuator module comprising multiple types of actuators that may be configured to release a spring mechanism of the container assembly, push the piston 102, pull the platform 103, or a combination of these functions without limiting the scope of the present invention. A person of ordinary skill in the art will appreciate that a variety of actuators and actuator types may be employed to achieve the desired functions described in this disclosure.

Controller 105 is coupled to or in communication with actuator 104 and curing light module 106. Controller 105 may comprise a memory with executable instructions, the instructions configured to: (a) actuate movement of the piston 102 inside a first chamber of the container assembly 101, the piston 102 adapted to hydraulically actuate movement of a platform 103 inside a second chamber in fluid communication with the first chamber; (b) transfer at least a portion of a printing material stored at least partially in the first chamber to the second chamber, the second chamber including a printing area between a surface of a window and the platform; (c) emit a curing light through the window to cure a layer of the printing material to the platform 102 or to a previously cured layer of the printing material already cured onto the platform 102; and (d) repeat steps (a)-(c) until a three-dimensional object is formed.

Curing light module 106 is a light module configured to emit a curing light through a window of the container assembly or cartridge to cure at least a portion of, or a layer of, the printing material to the platform or to a previously cured layer of the printing material until the three-dimensional object is formed. Any suitable light source and light type may be used, so long as the light source is the type suitable for curing the printing material.

Turning to the next figure, FIG. 2-2 illustrates a block diagram of a device for holding printing material in accordance with the present invention. In exemplary embodiments, the device includes an assembly that functions as a container (for long term storage of the printing material) as a tank (for storing printing material to be used during a printing process) and as a platform on which a desired 3D-object may be formed. This device, for example a container assembly, may be reusable in some embodiments, and may be a type of cartridge that is a single-use cartridge suitable for storing just enough printing material for printing a type of desired object, as will be further explained below with reference to other figures.

In exemplary embodiments, as illustrated in FIG. 2-2, container assembly 101 may include: a first chamber 107 adapted to store a printing material (i.e., in an initial or storage stage, most (although not necessarily all, of the printing material may be stored inside the first chamber); a second chamber 108 in fluid communication with the first chamber 107; and a piston 102 movable inside the first chamber 107, configured to: actuate movement of a platform 103 inside the second chamber 108, and transfer a portion of the printing material in the first chamber 107 to the second chamber. The second chamber 108 may include a printing area between a surface of a window and the platform 103 in the second chamber 108 (see, for example, FIG. 6, FIG. 12, FIG. 25).

As will become clearer with reference to other figures below, in some exemplary embodiments, movement of the piston 102 may hydraulically actuate movement of the platform 103. In some exemplary embodiments, movement of the piston 102 inside the first chamber hydraulically actuates a piston in the second chamber, the piston in the second chamber forming at least a portion of the platform 102. In some exemplary embodiments, the piston 102 is adapted to move in a single direction along an axis of the first chamber until the three-dimensional object is formed. In some exemplary embodiments, the piston 102 is further adapted to continuously move along the axis of the first chamber until the three-dimensional object is formed. In some exemplary embodiments, the piston 102 is further adapted to pause movement at programmable intervals until the three-dimensional object is formed.

Figures 2, 3:
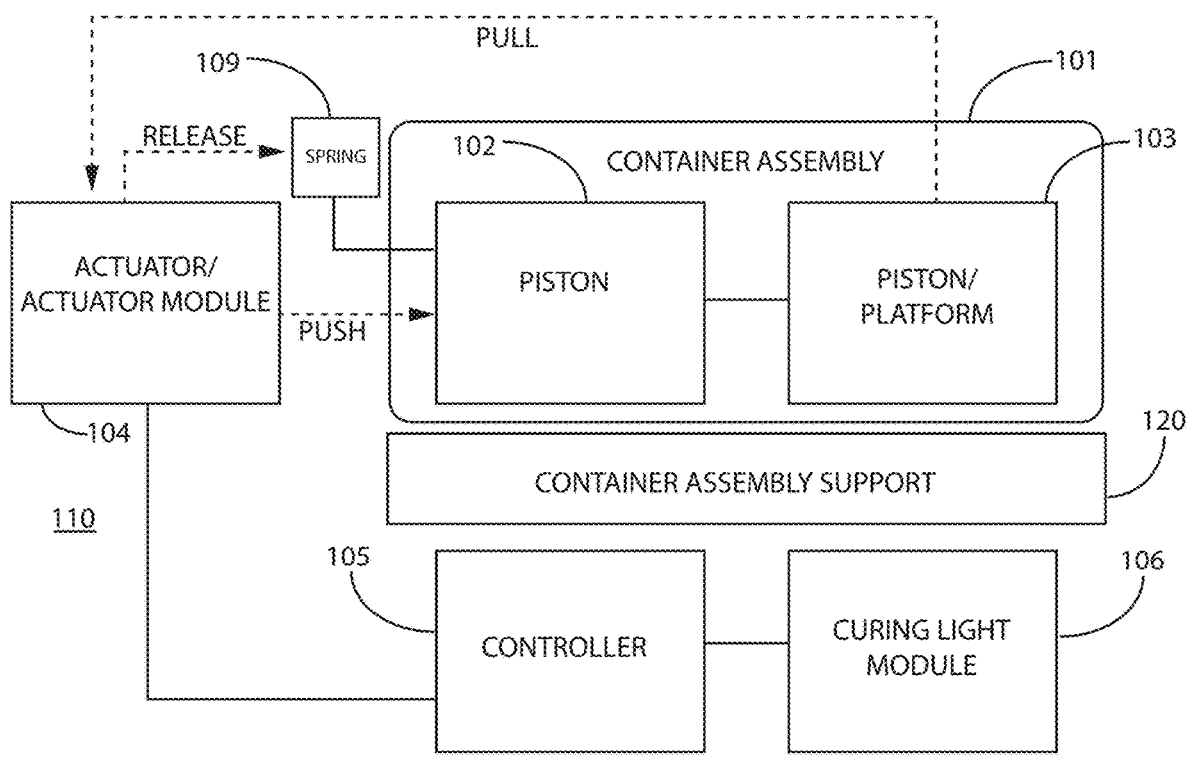
Figures 1, 3:
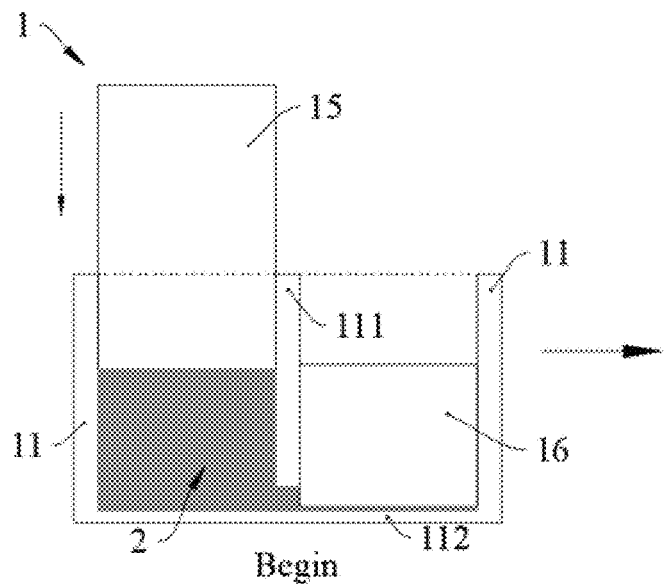
Figures 2, 3:
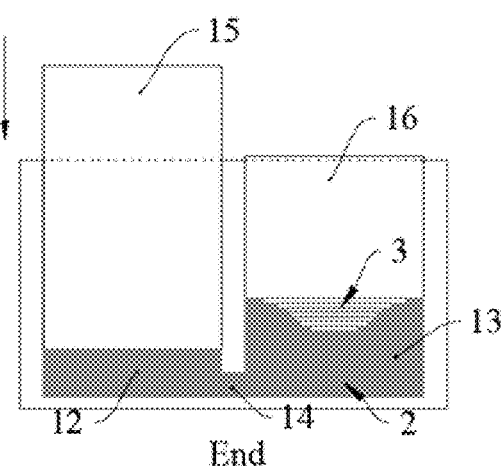

FIG. 2-3 illustrates a block diagram of a device for building or printing a three-dimensional object in accordance with the present invention. More specifically, FIG. 2-3 illustrates a block diagram of an apparatus 110, for example a 3D printing system, for printing 3D objects. Apparatus 110 may include: an actuator or actuator module 104 adapted to actuate movement of a piston 102 movable inside a container assembly 101, the container assembly 101 adapted to hold one or more printing materials and to print a three-dimensional object; a base or container assembly support 120 adapted to receive and or secure the container assembly 101; a controller 105 coupled to the actuator 104; and a curing light emitting module 106, in communication with the controller 105, wherein the controller 105 is configured to: (a) actuate movement of the piston 102 inside a first chamber of the container assembly 101, the piston 102 adapted to hydraulically actuate movement of a platform 103 inside a second chamber in fluid communication with the first chamber; (b) transfer at least a portion of a printing material stored at least partially in the first chamber to the second chamber, the second chamber including a printing area between a surface of a window and the platform (see for example, and without limiting the scope of the present invention, FIG. 6, FIG. 12, FIG. 25); (c) emit a curing light through the window to cure a layer of the printing material to the platform 102 or to a previously cured layer of the printing material already cured onto the platform 102; and (d) repeat steps (a)-(c) until a three-dimensional object is formed layer by layer.

In some exemplary embodiments, the container assembly 101 includes a spring 109 or similar mechanism that actuates the piston 102. In some exemplary embodiments, the container assembly 101 excludes the spring mechanism. In exemplary embodiments, spring 109 may be released by the controller 105, for example by actuating the actuator adapted to release the spring; the spring may be adapted to actuate movement of the piston once the spring is released or the mechanism is activated by actuator 104, or even manually by a user. In some exemplary embodiments, the actuator 104 is configured to push directly or indirectly on the piston to move the piston inside the chamber of the container assembly. In some exemplary embodiments, the piston 102 hydraulically actuates movement of the platform 103. In some exemplary embodiments, spring 109 is instead coupled to platform 103 and pulls on the platform which hydraulically actuates the piston 102.

In some exemplary embodiments, the actuator 104 is instead configured to pull directly or indirectly on the platform 103. In some embodiments, the spring mechanism on the cartridge or container assembly is actuated to move the piston, and in addition actuator 104 also pulls directly or indirectly on the platform 103. In some embodiments, the container assembly does not include the spring mechanism and actuator 104 pulls directly or indirectly on the platform 103. In some embodiments, the container assembly does not include the spring mechanism and actuator 104 pushes directly or indirectly on the piston 102. In some exemplary embodiments, actuator 104 merely releases spring mechanism 109 to actuate or move piston 102. In exemplary embodiments, releasing the spring actuates movement of the piston, and the controller actuates an actuator 104 configured to pull directly or indirectly on the platform 103.

Container assembly support 120 may be any suitable structure adapted to receive at least a portion of container assembly 101. For example, container assembly support 120 may be as simple as a generally flat base, or may be a more complex structure adapted to receive and register with a portion of container assembly 101 in order to secure container assembly 101 to the support structure 120. In exemplary embodiments, support structure 120 secures the container assembly, or even multiple container assemblies, during a printing job so that actuation of the piston or platform does not undesirably move the container assembly in a manner that interferes with the quality of the print job.

Turning to the next set of figures, FIG. 3-1 through FIG. 3-2 illustrate a device and method in accordance with exemplary embodiments of the present invention. More specifically, FIG. 3-1 shows an exemplary hydraulic device at a beginning stage and FIG. 3-2 shows the device at an end stage of an exemplary printing process during which a 3D-printed object is formed. With reference to FIG. 3-1, the hydraulic device 1 includes a body or housing 11, multiple chambers (for example, a standby resin chamber 12, and a printing chamber 13), a channel 14, a piston 15, and a platform 16. The body 11 may be generally a hollow structure with only a top region having one or more openings; the hollow structure may be divided into chamber 12 and chamber 13 by a clapboard or divider 111. In exemplary embodiments, due to the divider 111 at least partially not touching the bottom of body 11, channel 14 may be formed between chamber 12 and chamber 13, thus fluidly communicating both chambers. The printing material, in this exemplary embodiment a resin 2, may therefore flow from chamber 12 to chamber 13 through channel 14 as piston 15 is moved into chamber 12; hydraulically moving the platform 16 in chamber 13. The piston 15 at least partially installs in the standby resin chamber 12, the platform 16 also at least partially installs in the printing chamber 13.

A baseplate 112, which may form a bottom portion of body 11, may include a window situated between the platform 16 and a light engine 4 of a printing device (see for example FIG. 4), and may be preferably transparent (or, at least transparent at a region suitable for directing adequate light toward the platform 16, which is inside the printing chamber 13—the printing area, as will be discussed further below with reference to other figures), so that the radiation or curing light emitted from a light curing module may pass through and cure the exposed printing material, or resin 2, in the printing area or zone to allow the resin to cure either onto the platform or onto a previously cured layer of the printing material used.

As may be appreciated from FIG. 3-1 and FIG. 3-2, another aspect of the invention involves a method. That method may be described with reference to these figures as follows:

(1) Initial Stage:

In an initial stage, the platform 16 may be installed or positioned closer to the bottom of printing chamber 13 than to the top of the printing chamber, not necessarily touching but may be allowing for an initial layer or thickness of the printing material onto a top surface of the baseplate 112. A certain volume resin 2 may be filled into standby resin chamber 12 and channel 14. In exemplar embodiments, the type and size of the target 3D object (to be printed), for example a height of the object to be printed, may dictate the specific volume of resin 2 to be used and the height of the initial layer that is present in the second or printing chamber 13 at an initial stage. At this initial stage, the piston 15 may be installed or positioned at least partially inside the chamber 12, touching a top surface of the resin 2 inside the storage or standby chamber 12.

(2) Printing Process/Stage

During the printing process, the piston 15 is actuated down a certain distance (e.g., 0.1 mm, which may be determined in part by the thickness of each layer of the 3D object, the relative sectional area of chamber 12 and chamber 13), because resin 2 cannot be compressed, movement of the piston hydraulically moves the platform; the resin 2 flows into printing chamber 13 from chamber 12, for example by moving a single layer of thickness from chamber 12 to chamber 13, platform 16 may be actuated up a single layer of thickness as well.

During the printing process, in addition to movement of the piston and platform, light engine 4 may project a specific pattern to a printing area below or aligned with printing chamber 13, so that at least a layer of the resin 2 in the chamber 13 may be cured, and the cured resin will be adhered to the platform 16. Throughout the process, including printing a next or following layer, the hydraulic printing device will repeat the above steps, until the entire 3D object is completed.

(3) End Stage

During or at the end stage, the entire 3D object has been printed, a user may remove the platform 16 from printing chamber 13, and further, decouple the desired 3D object from the platform 16. In some exemplary embodiments a means may be provided to eject the platform from the chamber 13 and or housing 11.

Figure 4:
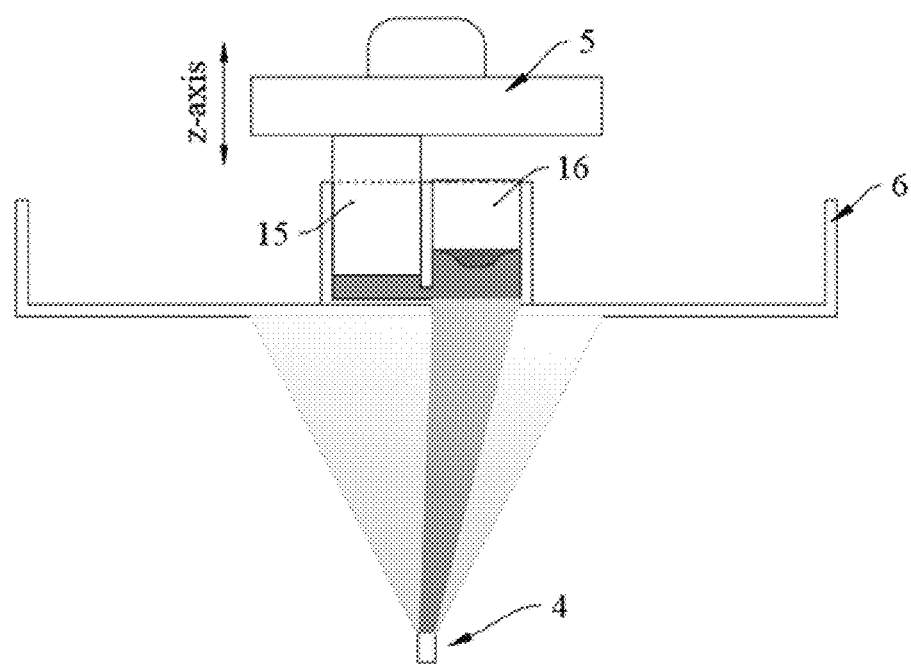
FIG. 4 illustrates a system in accordance with exemplary embodiments of the present invention.

FIG. 4 illustrates a system in accordance with exemplary embodiments of the present invention. As shown in FIG. 4, in some exemplary embodiments, in order to reduce the 3D printer's complexity, the printing device 1 may be installed on an existing 3D printer, for example and without limiting the scope of the present invention in any way, installed on top of an existing resin tank 6; in this configuration, the tank 6 will be empty but its clear or transparent bottom may be used to support a base of device 1.

In the non-limiting example shown in FIG. 4, the piston 15 of device 1 is actuated by build platform 5, and the sectional area of chamber 12 and chamber 13 is the same, so when printing a smaller 3D object, the user does not need to adjust the 3D printer's basic parameters (e.g., print speed, each stroke of build platform 5, etc.), or set other parameters to compensate. In other embodiments, the hydraulic printing device 1 may be installed on a mounting base 7 (see FIG. 9, for example) which may be configured to receive and secure the hydraulic printing device 1 in place.

Figure 5:
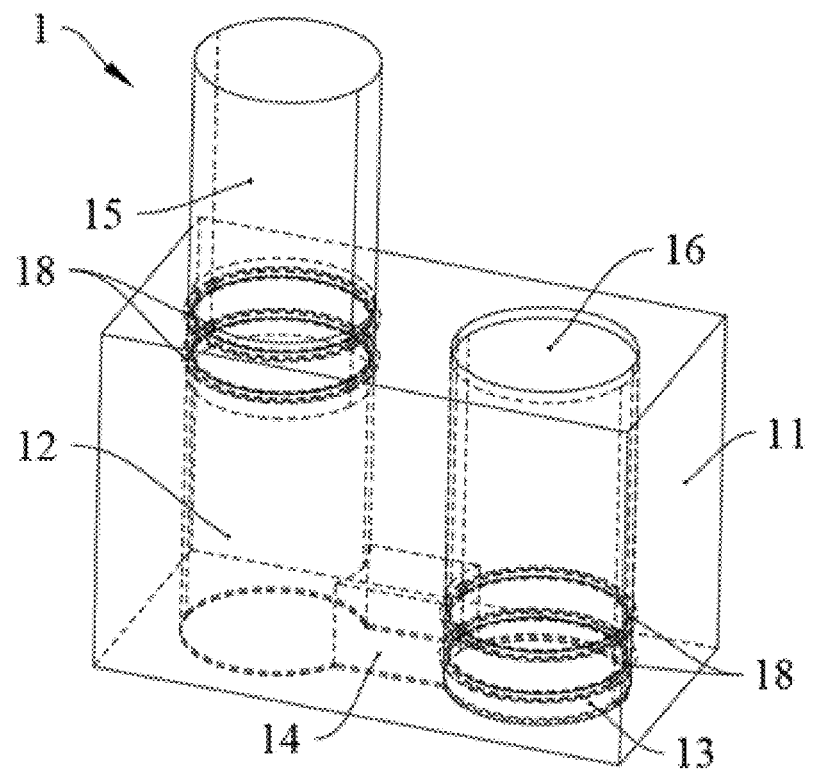
FIG. 5 illustrates a container assembly for printing 3D objects in accordance with exemplary embodiments of the present invention.

Turning to the next figure, FIG. 5 illustrates a container assembly for printing 3D objects in accordance with exemplary embodiments of the present invention. More specifically, FIG. 5 shows an exemplary embodiment of hydraulic printing device 1 that may optionally include several seal rings 18, which may be fixed on the bottom of piston 15 and platform 16, and configured to prevent printing material such as curable resin 2 from leaking outside of a housing or container body 11.

Figure 7:
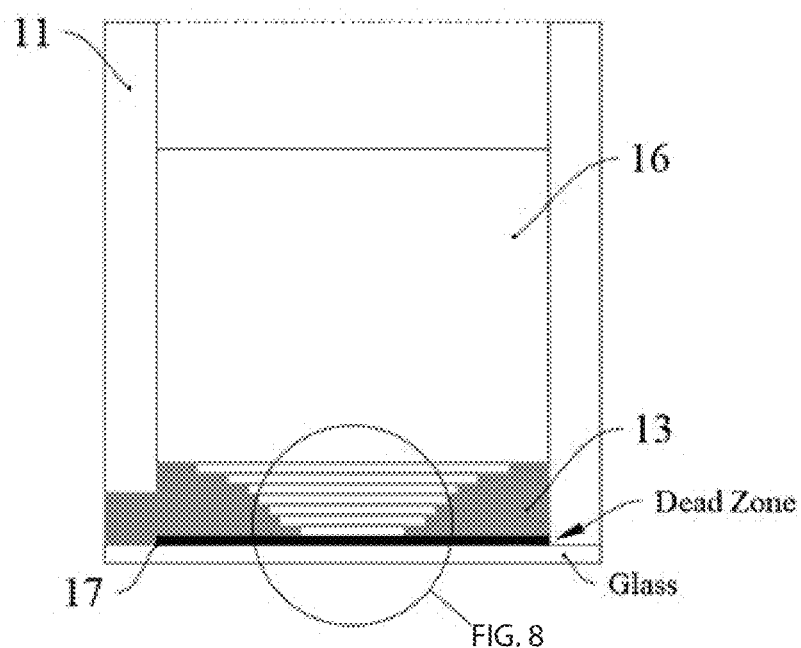
FIG. 7 illustrates an exemplary cross-sectional view of a chamber of a device for printing 3D objects in accordance with exemplary embodiments of the present invention.

In exemplary embodiments, baseplate 112 may be substituted by a flexible film 17 (e.g. PDMS Film, TPX Film, FEP Film; see for example also FIG. 7). Compared to the rigid baseplate 112, the adhered force between cured resin and film 17 will be significantly decreased, so that the cured resin will be easier to separate with flexible film 17, and further, the printing speed will increase also. However, if hydraulic printing device 1 does not include a rigid baseplate 112, then in exemplary embodiments the device may be simply placed and or fixed on a rigid structure—for example, and in no way limiting the scope of the present invention, placed on a glass of a mounting base 7 (see FIG. 9), or placed on an existing resin tank 6 (see FIG. 4). In some exemplary embodiments, the resin tank 6 may include a mounting base 7 that is fixed or integral with a base plate of the device 1 (see FIG. 9), such that the glass surface provides the rigid surface. Otherwise, if not placed on the rigid structure, the flexible film 17 will be deformed down while the piston is pushing the resin 2 and the hydraulic pressure may not be sufficient to move platform 16 and further drive it out of the second chamber. In exemplary embodiments, the flexible film 17 may be an oxygen permeation film. In this embodiment, the baseplate of the hydraulic printing device may be substituted by an oxygen permeation film 17, and it may be placed on a glass of mounting base 7.

During a printing process, oxygen permeates the film 17, and forms a 'dead zone' on the top surface of film 17. The 'dead zone' typically impedes polymerization reaction within the 'dead zone', which is beneficial to prevent the 3D-object 3 from undesirably adhering to film 17. Naturally, this contributes to decreasing the adhered force between the 3D-object 3 and film 17, and increasing the printing speed. The dead zone principle is described by Carbon, Inc. in U.S. Pat. No. 9,360,757.

Figure 8:
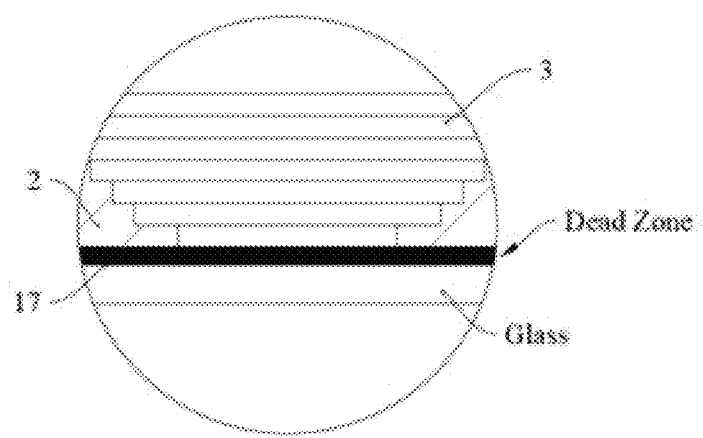
FIG. 8 illustrates an exemplary close-up view of the cross-sectional view shown in FIG. 7.

In general, the invention adopts the principle of "Liquids are basically incompressible". Based on this principle, while the stand-by resin is pushed by a piston, a certain volume resin will flow into the printing chamber 13 from chamber 12, and platform 15 will be driven up an appropriate or commensurate distance. The reduced volume of stand-by chamber 12 is equal to the increased volume of printing chamber 13. Thus, by controlling the running speed of piston 15, the relative sectional area of chamber 12 and chamber 13, printing thickness, speed, and other properties may be accurately adjusted. FIG. 8 illustrates an exemplary close-up view of the cross-sectional view shown in FIG. 7.

The present invention may be suitable for printing a wide array of objects, but may be especially suitable for printing smaller 3D-objects, for example printable dental crowns used by dental professionals on their patients. In exemplar embodiments, a device such as device 1 could be easily mounted on an existing 3D printer. As will be discussed further below with reference to other figures, in some exemplary embodiments, more specialized printers suitable for engaging with a specialized container assembly or cartridge may be employed, in accordance with the present invention.

Compared to the traditional printing method (e.g., top-down, bottom-up), in a device in accordance with the present invention, the printing material may be always in a closed chamber, and never in direct contact with air until after the desired object is completed and most or all of the printing material is for all intents and purposes used up. Thus, a printing system and method as proposed in this disclosure effectively decreases the influence of humidity and dust in the air that adversely affects printing materials and the quality and durability of the 3D printed objects formed using said system and method.

Turning now to FIG. 7, an exemplary cross-sectional view of a chamber of a device for printing 3D objects in accordance with exemplary embodiments of the present invention is illustrated.

In the traditional 3D printer, due to machine limitations (e.g., the motor and electronic control accuracy), every rise or fall of a build platform has a minimum stroke called $Z_{min}$.

Under this limitation, the height of each layer that forms the intended 3D-object must be higher than $Z_{min}$, so that in the traditional 3D printer, we cannot further improve the accuracy of 3D object in Z-axis. However, in accordance with the present invention, it is possible to break the $Z_{min}$ by adjusting the relative sectional area of chamber 12 and chamber 13.

Figure 9:
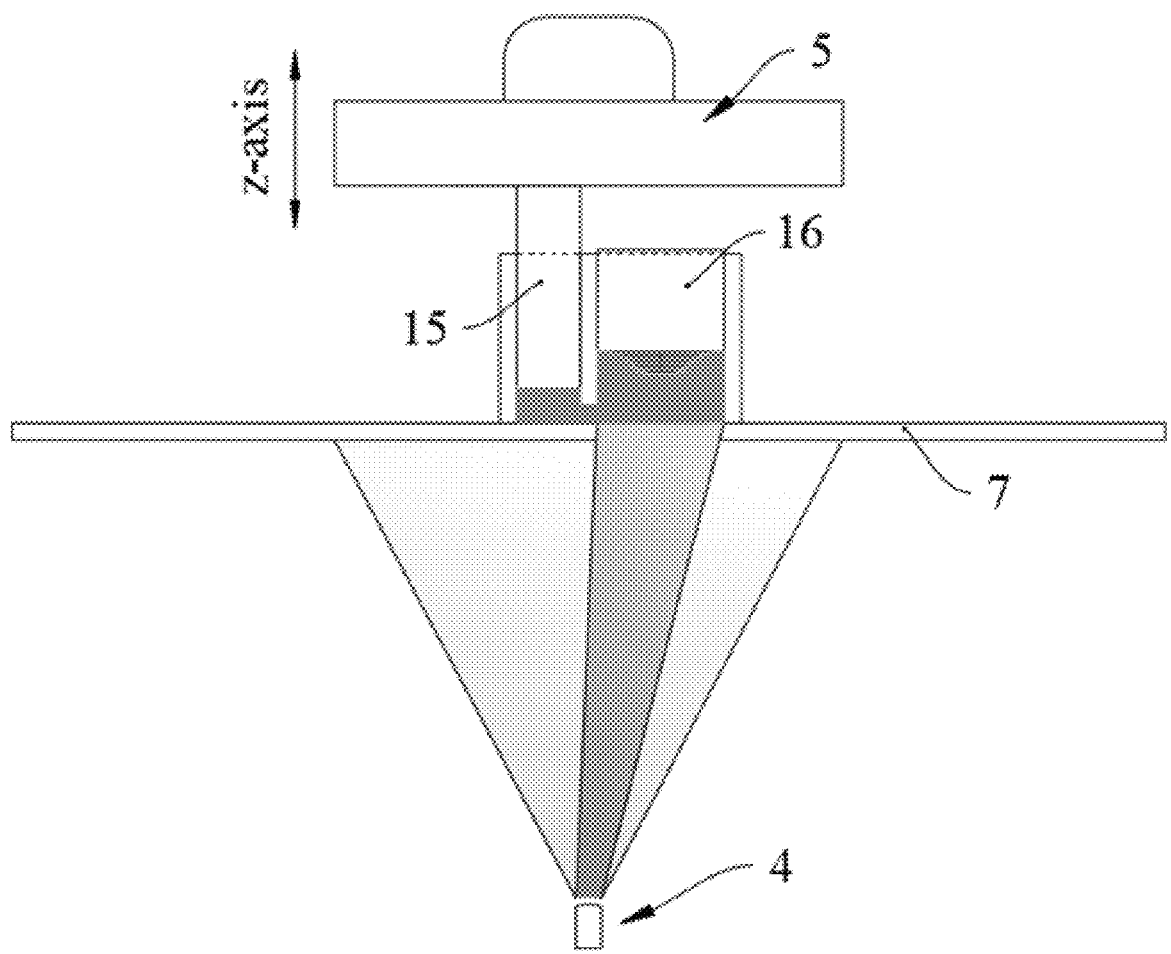
FIG. 9 illustrates a system in accordance with exemplary embodiments of the present invention.

For example, and without limiting the scope of the present invention, as shown in FIG. 9, the sectional area of printing chamber 16 may be increased so that it is twice the section area of chamber 15, so when build platform 5 is moved down the $Z_{min}$ height, the platform 16 may be driven up half of $Z_{min}$. Accordingly, with the present invention, it is possible to divide a 3D object into more layers to print, thus improving accuracy of the 3D object in Z-axis.

Figure 6:
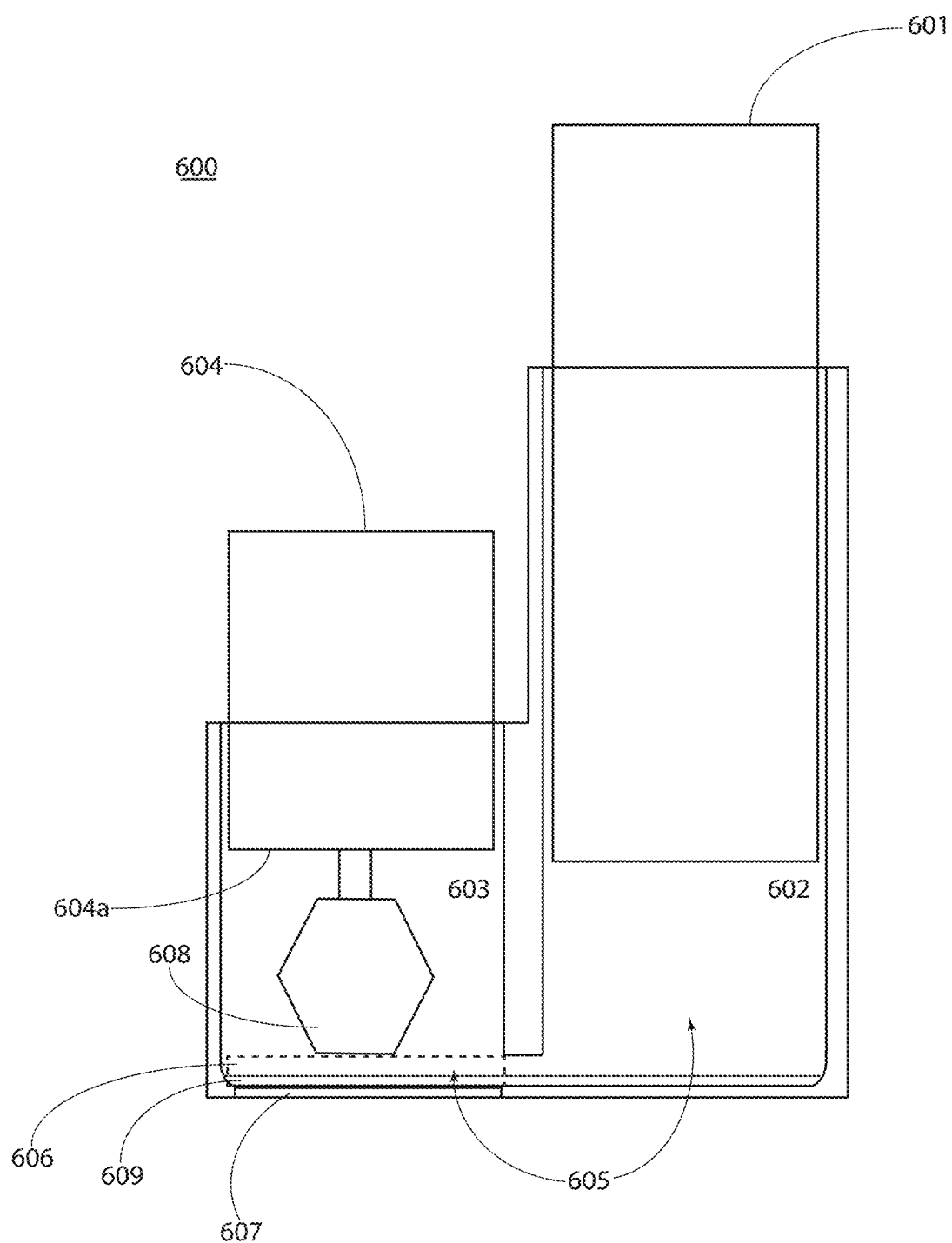
FIG. 6 illustrates a container assembly for printing 3D objects in accordance with exemplary embodiments of the present invention.

FIG. 6 illustrates a cross-sectional view of an exemplary container assembly for printing 3D objects in accordance with exemplary embodiments of the present invention. More specifically, FIG. 6 shows a container assembly 600, shown during or subsequent to having completed a printing job, thus shown with a 3D-printed object still cured onto a platform still inside a chamber of the container assembly.

As shown in this view of FIG. 6, container assembly 600 may comprising a piston 601 that moves along a z-axis of a first chamber 602 in fluid communication with a second chamber 603, piston 601 is adapted to hydraulically actuate movement of a platform 604 inside the second chamber 603, by for example moving or transferring at least a portion 605 of a printing material stored in the first chamber 602 to a printing area 606 inside the second chamber 603 (the printing area 606 shown in dotted lines, between a surface of a window 607 and a surface 604a of the platform 604. When container assembly 600 is actuated during a printing job, a curing light engine configured to emit a curing light, directs a curing light through the window 607 to cure a layer of the printing material within the printing area onto the platform or to a previously cured layer of the printing material that has been previously cured onto the platform. By subsequently repeating these steps, a three-dimensional object 608 may be formed. In some exemplary embodiments, window 607 may be a glass or similarly hard transparent or semitransparent surface. In some exemplary embodiments, the glass or similarly hard transparent or semitransparent surface may be treated with a coating layer 609 such as a gel, for example a PDMS gel coating on a glass surface of window 607.

Figure 10:
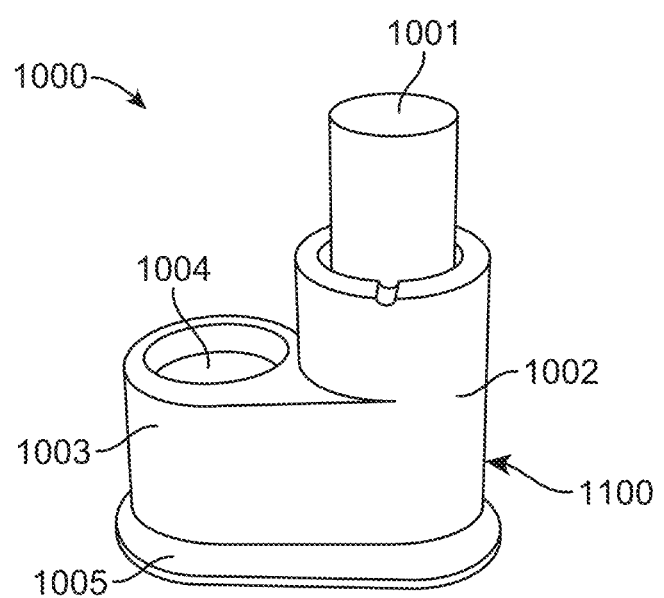
FIG. 10 illustrates a container assembly for printing 3D objects in accordance with exemplary embodiments of the present invention.
Figure 11:
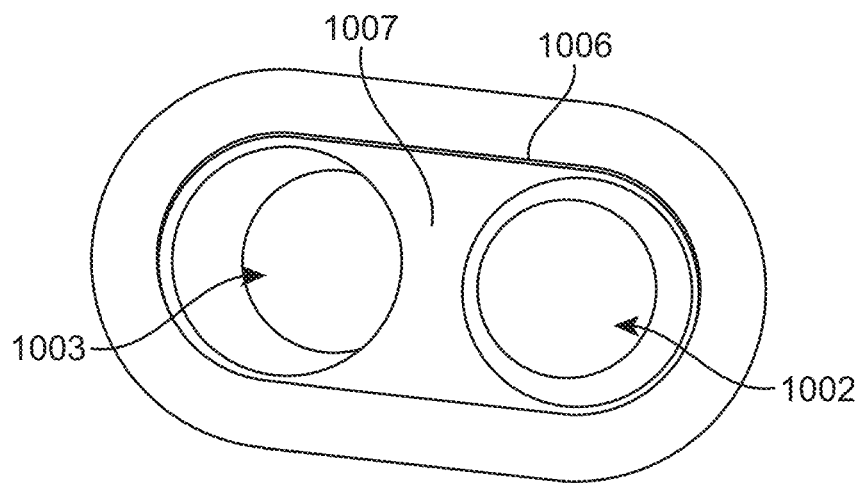
FIG. 11 illustrates an exemplary bottom view of a container assembly for printing 3D objects in accordance with exemplary embodiments of the present invention.
Figure 12:
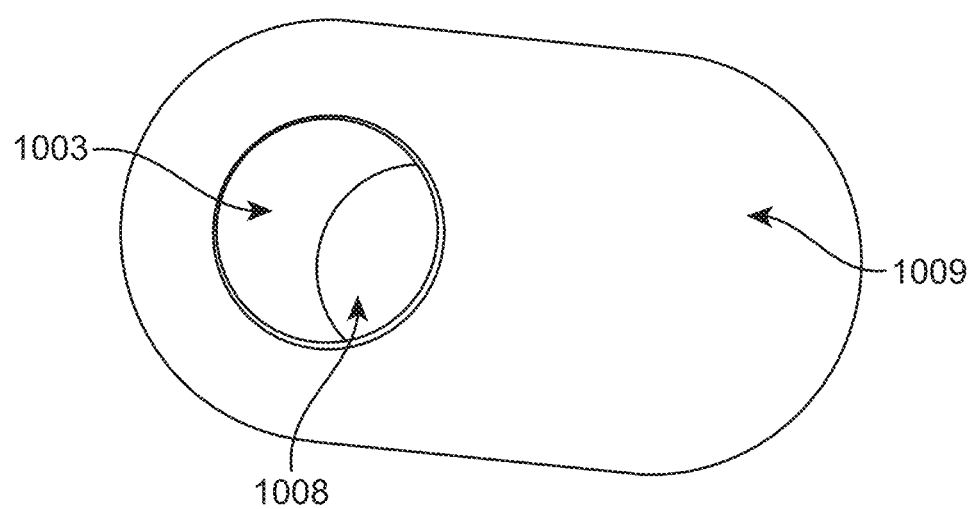
FIG. 12 illustrates an exemplary bottom view of a container assembly for printing 3D objects in accordance with exemplary embodiments of the present invention.
Figures 3, 12:
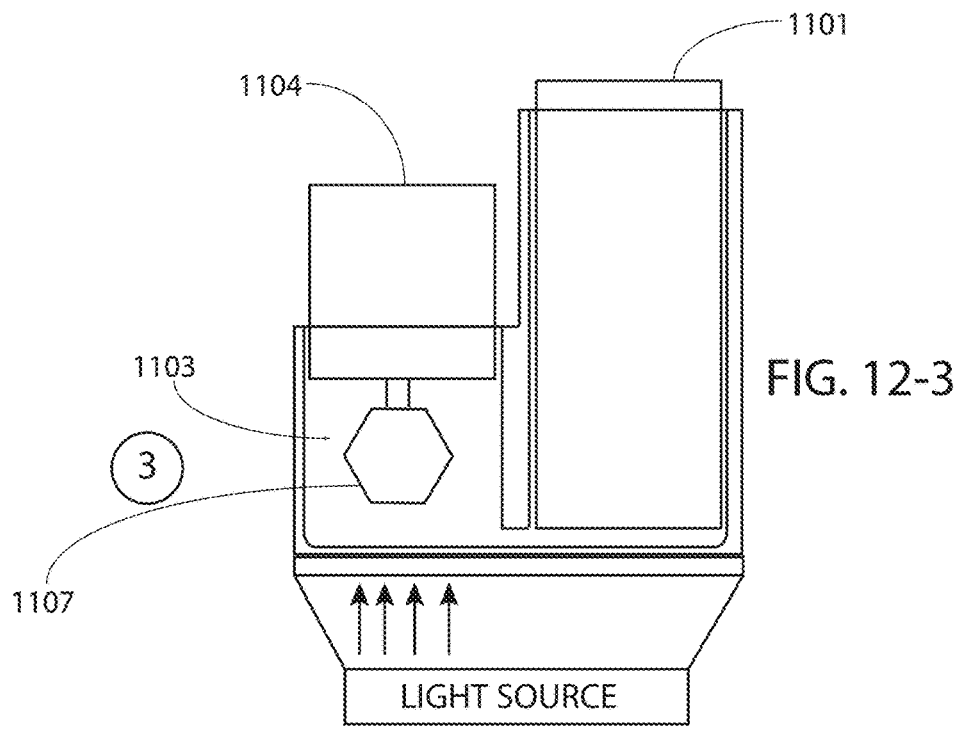
Figures 4, 12:
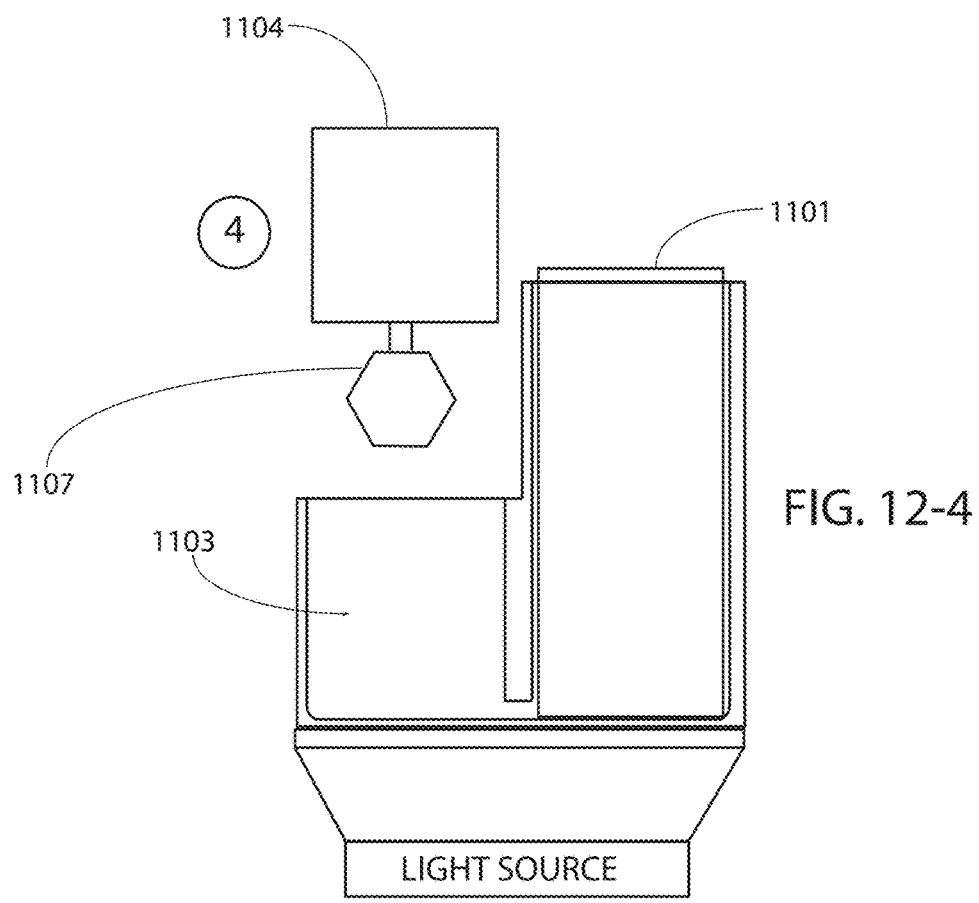

Turning now to the next set of figures, FIG. 10-FIG. 12 illustrate another exemplary embodiment in accordance with the present invention, which shows a container assembly configured for building a single 3D-printed object, whereby the container assembly comprises a body, which may be exemplarily, although in no way limiting the scope of the present invention, shaped like a boot or otherwise have a boot-shaped body that includes multiple fluidly connected chambers (i.e., similar to those chambers shown in the embodiments of FIG. 3 and FIG. 6).

In FIG. 10, the exemplary container assembly 1000 comprises a housing or body 1100 that includes a first chamber 1002, which initially holds the printing material and is adapted to receive at least a portion of a first piston 1001. A second chamber 1003 is adapted to receive at least a portion of a second piston that forms at least part of a platform 1004, wherein chamber 1002 is fluidly connected to the second chamber 1003 so that as piston 1001 is moved, or in this case pressed, the volume decreases inside chamber 1002, transferring, at least a portion of the printing material to chamber 1003, for example by hydraulically driving the printing material into chamber 1003 so that a layer of the printing material between the platform and a base or window of the container assembly may be exposed to a light source that cures the printing material onto the platform 1004.

In exemplary embodiments, a base 1005 forms or secures a window 1008 (see FIG. 12) at a bottom portion of the container assembly 1000, wherein the window is configured to allow a light source to direct a curing light onto a layer of the printing material that is transferred into chamber 1003. The light source may then be directed towards window 1008 in order to print each layer onto a surface of the build platform 1004.

FIG. 11 and FIG. 12 show images of the bottom section of container assembly 1000. From the view of FIG. 11, it may be appreciated that the chambers 1002 and 1003 are fluidly connected at a bottom region of the container assembly. More specially, a channel 1007 may be formed at the bottom of the container to fluidly connect chambers 1002 and 1003. This channel 1007 may be sealed by way of a base bottom surface, which may be glass or may be part of the container assembly body 1001, the channel 1007 in part formed by a recess 1006 that separates the bottom of each chamber 1002 and 1003 from the terminal end of the housing 1100.

In exemplary embodiments, as illustrated in the view of FIG. 12, it may be appreciated that in some exemplary embodiments, window 1008 is precisely below chamber 1003 (i.e., the chamber in which the platform 1004 is slidably housed therein), and may be positioned so that only the printing material layer below chamber 1003 is exposed to the curing light. For example, and without deviating or limiting the scope of the present invention, this may be achieved by including a base 1009 that is solid but for a transparent aperture that forms the window 1008.

Turning now to the next set of figures, FIG. 12-1-FIG. 12-4 illustrate a method of printing a 3D-printed object performed by a system in accordance with exemplary embodiments of the present invention.

By way of example, and without limiting the scope of the present invention, starting at FIG. 12-1, at step (1), a platform 1104 of a container assembly 1100 may be actuated from an initial position or state of the device. For example, initially, platform 1104 may be positioned at its lowest or most submerged position inside chamber 1103. In this initial or starting stage, a 3D-printer component such as a printing arm or the like, may be coupled to piston 1101 and adapted to actuate (for example, by pressing down on) piston 1101 into chamber 1102, which initially holds at least some or most of the printing material within.

In some exemplary embodiments, the container assembly 1100 may hold most of the printing material, for example a resin, inside chamber 1102, and have just enough printing material inside chamber 1103 suitable for curing an initial layer of the desired 3D-printed objected. In other exemplary embodiments, the piston 1101 must first be actuated in order to introduce a proper or adequate first layer of printing material into chamber 1103. Accordingly, whether a suitable layer of printing material is already in chamber 1103, or a suitable layer of printing material must be initially introduced into chamber 1103 by actuation of the piston 1101, a curing light module 1105 may be simultaneously or subsequently activated in order to start emitting a curing light onto the suitable layer of printing material to cure the layer onto a surface of the platform 1104.

At step (2), as shown in FIG. 12-2, the process proceeds so that the actuated piston 1101 continues to move, transferring printing material between the fluidly communicated chambers 1102 and 1103. In some exemplary embodiments, the process is continuous, and the piston 1101 is continuously pushed into chamber 1102 so as to continuously introduce the printing material into chamber 1103 for printing the desired 3D-printed objected 1107. In some exemplary embodiments, there may be pauses in the actuation of the piston 1101; in exemplary embodiments, the timing of the actuation of the piston 1101 coincides with the timing of the activation of the light engine so as to maximize speed, efficiency, and quality of the 3D-printed object 1107. As exemplarily illustrated in FIG. 12-2, as the piston 1101 is actuated and moved further inside chamber 1102 to transfer a portion 1106 of the printing material into chamber 1103, platform 1104 may be respectively raised or moved out of chamber 1103.

At step (3), as shown in FIG. 12-3, the process continues: printing a next or following layer, the hydraulic printing device repeating the above steps, until the entire 3D object is completed. In exemplary embodiments, most or all of the printing material stored in the first chamber may be transferred to the second chamber (although not necessarily). As mentioned above, one of the benefits of the present invention is that the container assembly can keep the printing material required for a single use safe and in a sealed environment so as to conserve and preserve an optimum state of the printing material before use. This is a clear improvement over prior art printing methods that require opening containers of printing material that may be used after opening the packaged printing material, and which are often reused or not entirely used only to be used later when their shelf life and exposure to the environment reduces their efficacy.

At step (4), as shown in FIG. 12-4, the build or printing process may be completed. In exemplary embodiments, the platform 1104 may be removed entirely from chamber 1103, either manually or mechanically, so that the completed 3D-printed object 1107 may be accessed and separated from the platform 1104. Naturally, with the build process completed, the light engine may be deactivated or inactive. As may be appreciated from this exemplary method of building a 3D-printed object, in exemplary embodiments, the container assembly is a single-use assembly. Of course, in other exemplary embodiments, the same hydraulic principle may be applied in a multi-chamber tank assembly similar to the container assembly, which is not single-use and may be subsequently filled and used again.

As may be appreciated from the exemplarily described method of printing a 3D-printed object in accordance with the present invention, actuation of piston 1101 (or otherwise moving the piston 1101) may be achieved by movement in a single direction. That is, in the illustrated embodiment, piston 1101 is moved down into chamber 1102 in a single direction (i.e., piston 1101 is not pulled out of the chamber 1102 during the build process); this results in the platform 1104 also moving in a single direction (i.e., platform 1104 is never moved into chamber 1103, only in a single direction out of chamber 1103). Movement in a single direction facilitates a more efficient process overall since no time is wasted moving the platform towards and away from the printing material as is the case in prior art 3D printers that use stereographic methods of building 3D objects.

Figures 1, 13:
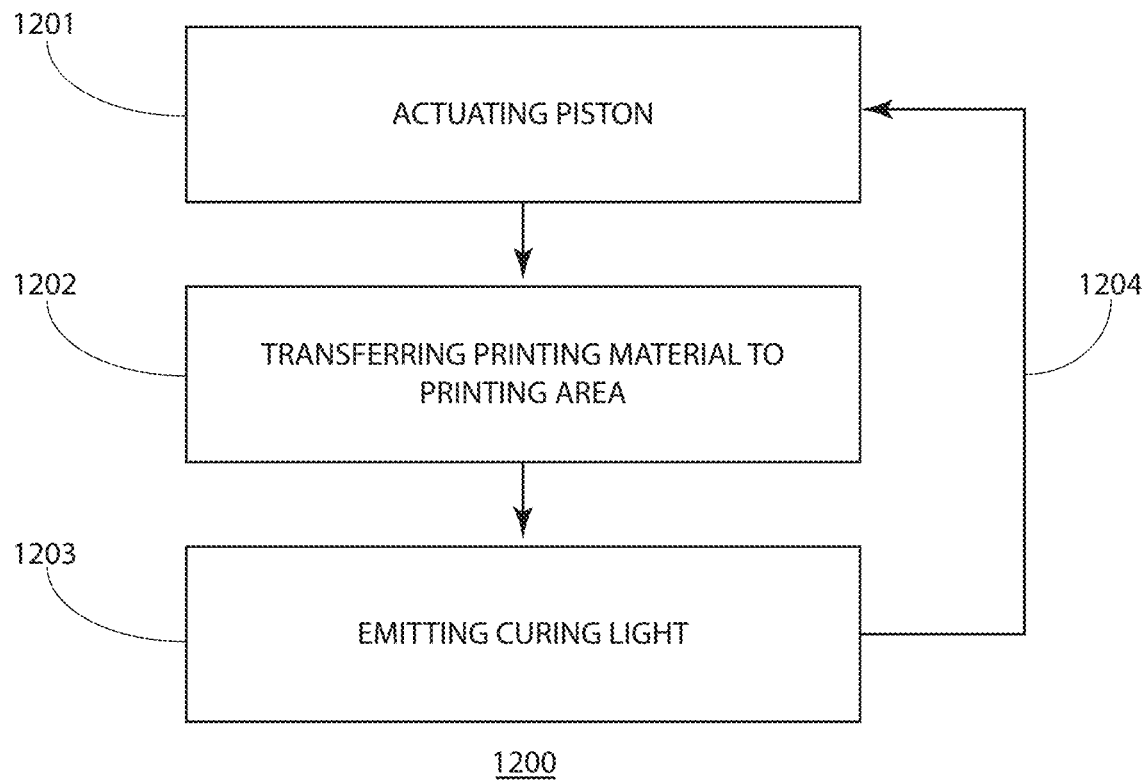
Figures 2, 13:
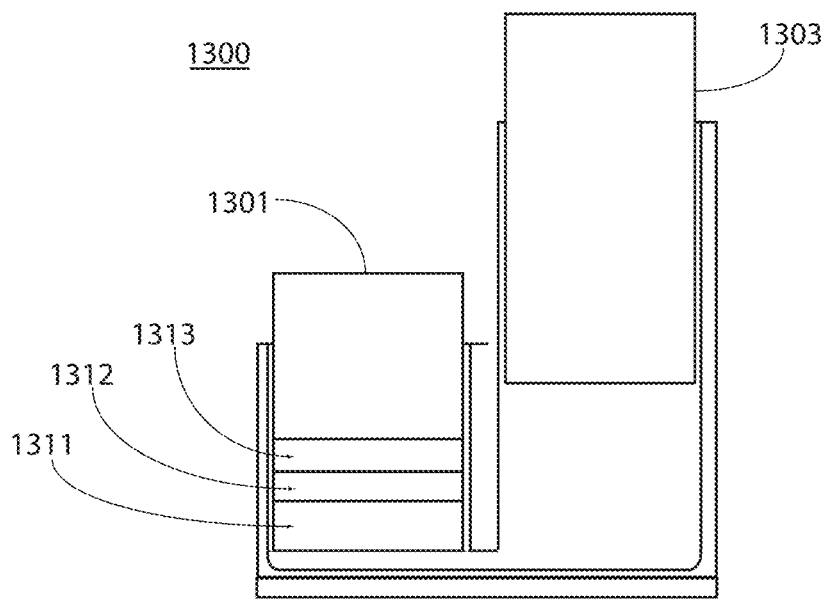

Next, FIG. 13 illustrates a method for printing three-dimensional objects in accordance with exemplary embodiments of the present invention. More specifically, FIG. 13 illustrates an exemplary method 1200. It should be understood that although method 1200 is shown in a particular sequence, it is conceivable that a different sequence with less or more steps may be performed without deviating from the scope of the present invention. In exemplary embodiments, method 1200 may include the following steps:

In step 1201, a piston on a device in accordance with the present invention, for example a container assembly, may be actuated or otherwise moved For example, the piston may be slidably moved into or through a chamber of the container assembly. This may involve actuating a piston inside a first chamber, wherein the piston is adapted to actuate movement of a platform inside a second chamber in fluid communication with the first chamber.

In step 1202, at least a portion of a printing material stored in a chamber may be transferred to a printing area between a surface of a window and the platform. This may typically involve transferring at least a portion of the printing material from a first chamber into a second chamber where the platform resides, and thus allowing a suitable layer of the printing material to be exposed to a curing light through the window.

In step 1203, a curing light may be emitted through the window to cure at least a portion of the layer of the printing material to the platform (i.e., if it is the first layer, for example) or to a previously cured layer of the printing material (i.e., if a preceding layer was already cured and a new layer is being formed onto an existing cured layer of the 3D object being formed).

In step 1204, steps 1201 through 1203 may be repeated until the desired 3D object is ultimately formed.

In some exemplary embodiments, step 1201 may include moving the piston in a single direction along an axis of the first chamber. In some exemplary embodiments, moving the piston in a single direction along an axis of the first chamber may include continuously moving the piston until the three-dimensional object is formed. In some exemplary embodiments, moving the piston in a single direction along an axis of the first chamber may include pausing movement of the piston at programmable intervals until the three-dimensional object is formed.

In some exemplary embodiments, step 1202 may include disposing the layer of the printing material on a glass surface of the window. In some exemplary embodiments, step 1202 may include disposing the layer of the printing material on a film or a coating layer that at least partially forms the window. In some exemplary embodiments, the film may be a flexible oxygen permeation film. In some exemplary embodiments, the film or coating layer may either be a polydimethylsiloxane (PDMS) film, a polymethyl pentene (PMP) film, a Transparent Polymer X (TPX) film, or a fluorinated ethylene propylene (FEP) film.

In some exemplary embodiments, step 1204 may include substantially consuming or transferring the printing material stored in the first chamber to the second chamber where the platform is housed.

In some exemplary embodiments, method 1200 may further include, after completion of the printing process, releasing the platform from the second chamber to allow access to the three-dimensional object formed on the platform. In some exemplary embodiments, method 1200 may further include, prior to step 1201—before actuating the piston—breaking or removing a seal of a container assembly that houses the first and second chambers.

In exemplary embodiments, method 1201 may be performed in part or completely by a controller of a system in accordance with the present invention. For example, and without limiting the scope of the present invention, controller 105 in FIG. 2-1 or FIG. 2-3. Accordingly, controller 105 may comprise a memory with executable instructions, the instructions configured to: (a) actuating a piston inside a first chamber, the piston adapted to actuate movement of a platform inside a second chamber in fluid communication with the first chamber; (b) transferring at least a portion of a printing material stored at least partially in the first chamber to a second chamber including a printing area between a surface of a window and the platform; (c) emitting a curing light through the window to cure a layer of the printing material to the platform or to a previously cured layer of the printing material already cured onto the platform; and (d) repeating steps (a)-(c) until a three-dimensional object is formed.

In some exemplary embodiments, actuating the piston inside the first chamber hydraulically actuates the platform. In some exemplary embodiments, actuating the piston inside the first chamber hydraulically actuates a piston in the second chamber, the piston in the second chamber forming at least a portion of the platform.

FIG. 13-2 illustrates a system for printing three-dimensional objects using multiple materials, in accordance with exemplary embodiments of the present invention. More specifically, FIG. 13-2 shows container assembly 1300 which is configured to build 3D-printed objects that may include multiple types of materials, such as printing materials 1311, 1312, and 1313, which may be cured onto platform 1301, for example by transferring multiple printing materials from a first chamber that houses a piston 1303 into a second chamber that houses the platform 1301. Each of the materials is used in accordance with the build specifications or parameters of the desired 3D-printed object, so that each material is introduced into the chamber housing the platform 1301 at a predetermined sequence so that the desired material sequence is cured as needed. With this exemplary embodiment, a 3D-printed object may be formed using different materials inside a container assembly or boot cartridge, to facilitate printing multi-color or multi-material products. In some exemplary embodiments, this may be achieved by way of implementing multiple pistons in separate fluidly connected chambers that are configured to transfer different printing materials from other cambers into the chamber that houses the build platform. Such an exemplary embodiment is shown with reference to the next figure.

FIG. 13-3 illustrates a system for printing three-dimensional objects using multiple materials, in accordance with exemplary embodiments of the present invention. More specifically, FIG. 13-3 depicts a first chamber housing a first piston 1301 and a first printing material 1304. A second chamber houses a second piston 1302 and a second printing material 1305. Both the first and second chambers are adapted for selective fluid communication with a third chamber that houses platform 1303. Selective fluid communication may be controlled by way of valves 1306 and 1307, for example one-way valves that allow either the first or second pistons to transfer printing material into the third chamber housing the platform.

In exemplary embodiments, the valves 1306 and 1307 may be configured to control the different materials' feeding speed. Platform 1303 is adapted to accept different materials during printing, and the system allows the same 3D-printed object to be printed with different materials at different layer heights.

Turning now to the next set of figures, a variety of structures and or components may be exemplarily disposed inside each chamber and or on an exterior of the piston and platform, in order to preserve a desired pressurized environment within the hydraulic system of the container assembly. In exemplary embodiments, these structures or components inside each chamber facilitate an airtight seal. For example, and without limiting the scope of the present invention, the airtight seal or pressurized environment may include treating the surfaces with materials that facilitate the same, and or employing structures such as O-rings and the like.

FIG. 14-FIG. 16 illustrate several views of a device in accordance with exemplary embodiments of the present invention. More specifically, FIG. 14 through FIG. 16 show cross-sectional views of a container's chamber with a piston or platform 1401, the walls 1402 forming the walls of the chamber. In exemplary embodiments, as shown in these views, a piston (or platform) may include at least one or a plurality of structures, for example O-rings 1403 that reside inside recessed walls 1404 of the piston 1401, to provide a tight seal that prevents spillage of the printing material, which is typically highly viscous.

As mentioned above, the airtight seal or pressurized environment helps maintain an optimum state of the printing material until it is used up during a printing protocol. Moreover, another of the benefits of the present invention is that the pressurized environment lends itself to utilization of highly viscous materials for building or printing 3D-objects. This is especially helpful for certain applications, including but not limited to applications in the dental field. For example, and without limiting the scope of the present invention in any way, in the field of dentistry, it may be desirable to print an object such as a crown. The inability to properly handle highly viscous printing materials is a problem that has yet to be adequately addressed by the prior art, and the present invention does by way of the hydraulic system of the tank or container assembly described herein.

In exemplary embodiments, the volume ratios of Chambers 1 and 2 is 1:1; in some embodiments a different ratio may be used so as to optimize the efficiency of the build process, as well as the quality of the 3D-printed object built. As such, the present invention may be practiced with similar or different sized chambers, lengths of chambers, volumes of chambers, and or the number of chambers, without deviating from or limiting the scope of the present invention.

Turning now to the next set of figures, FIG. 17 illustrates a system for printing three-dimensional objects in accordance with exemplary embodiments of the present invention, and FIG. 18 illustrates a base support configured to support or receive a container assembly or cartridge for the system shown in FIG. 17, in accordance with exemplary embodiments of the present invention.

More specifically, FIG. 17 illustrates printing system 1700, which includes a container assembly 1701 for holding a printing material to print a three-dimensional object; a piston 1702 movable inside a first chamber of the container assembly 1701, configured to: actuate movement of a platform inside a second chamber in fluid communication with the first chamber, and transfer a layer of the printing material stored in the first chamber to a printing area between a surface of a window and the platform in the second chamber.

Moreover, system 1700 includes at least one or more actuators 1703 coupled to a controller and configured to move the piston 1701 (for example by means of an arm 1704); and a curing light emitting module 1705, in communication with the controller, configured to emit a curing light through the window to cure at least a portion of the layer of the printing material to the platform or to a previously cured layer of the printing material until the three-dimensional object is formed.

In some exemplary embodiments, system 1700 includes a base support 1706 that is configured to receive a single cartridge or container assembly 1701. The base support may be a transparent base or have at least a transparent portion to enable the curing light module 1705 to direct a curing light into a printing area of the container assembly 1701.

As shown in FIG. 18, base support 1706 may have a region, such as region 1801 that optionally, although not necessarily, registers with a base portion of container assembly 1701; this may be useful to secure the container assembly 1701 to system 1700 during a printing process, so that the container assembly does not necessarily move and the curing light may be accurately projected during the printing process.

Figure 20:
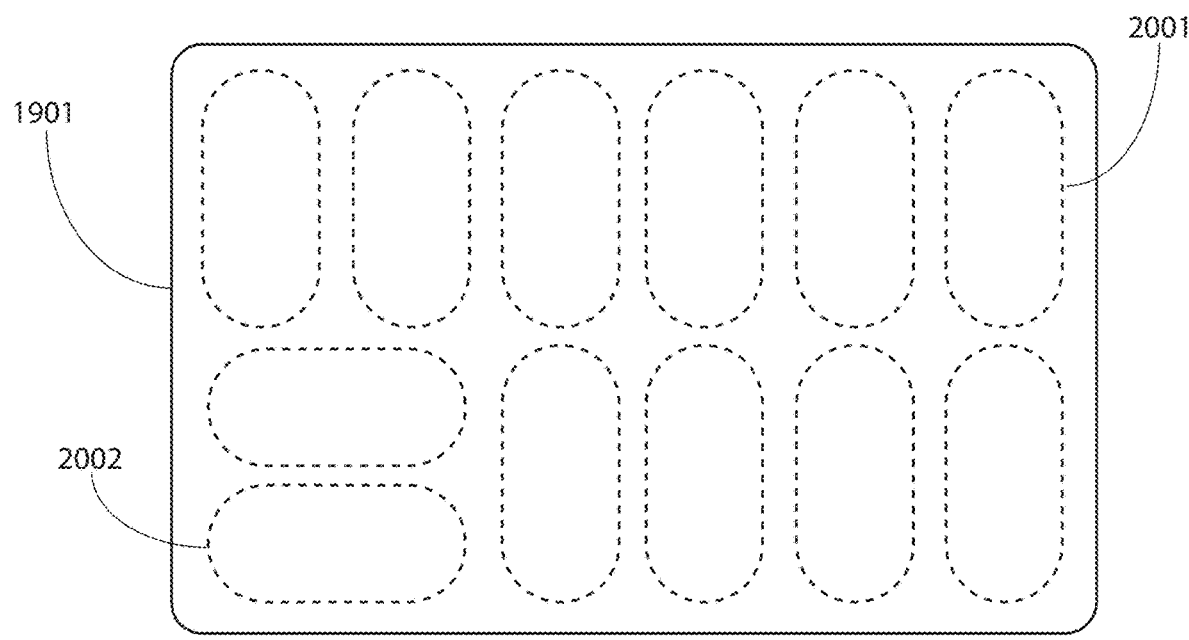
FIG. 20 illustrates a container assembly support configured to support or receive one or more container assemblies or cartridges for the system shown in FIG. 19, in accordance with exemplary embodiments of the present invention.

Next, FIG. 19 illustrates a similar system 1900, and FIG. 20 illustrates a similar base support 1901 configured to support or receive multiple container assemblies or cartridges, in accordance with exemplary embodiments of the present invention. An arm 1902 may be configured to simultaneously actuate each of a plurality of pistons of a plurality of container assemblies that may be secured to base support 1901. From the view in FIG. 20, it may be appreciated that a base support 1901 suitable for receiving multiple container assemblies need not be limited to a particular orientation—that is, a container assembly may be positioned along a width or along a length of the base support without deviating from the scope of the present invention, and may support multiple container assemblies or cartridges in multiple orientations; a surface of the base support may have individual recessed portions such as recessed areas 2001 and 2002 to register with one or more container assemblies.

Figure 21:
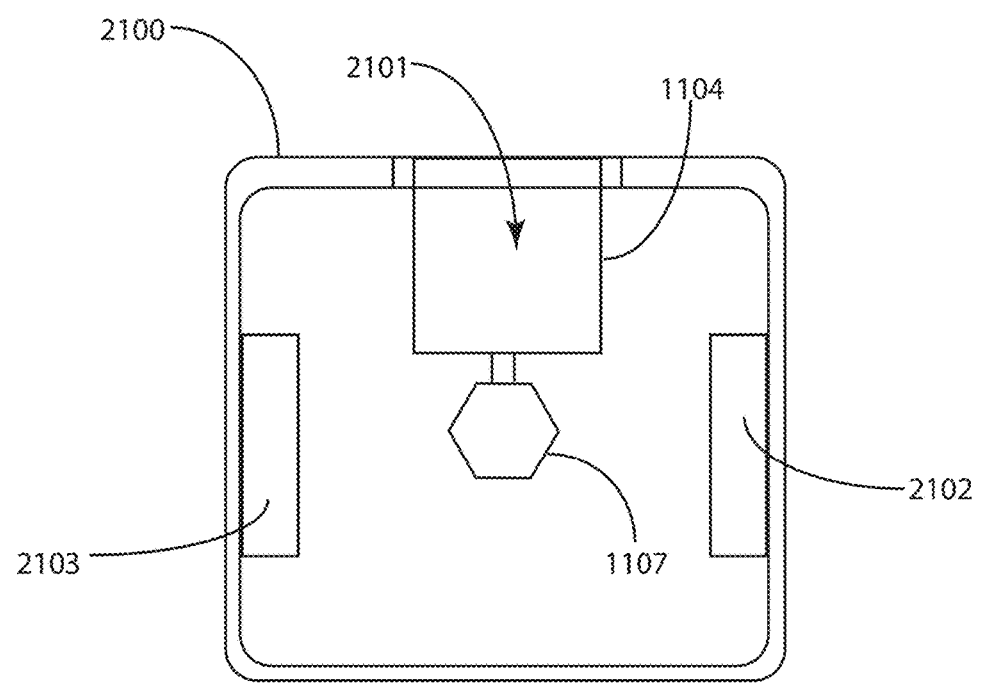
FIG. 21 illustrates a wash system adapted to receive a platform for a system for printing three-dimensional objects in accordance with exemplary embodiments of the present invention.

Now turning to the last figure, FIG. 21 illustrates a wash system adapted to receive a platform for a system for printing three-dimensional objects in accordance with exemplary embodiments of the present invention.

In exemplary embodiments, a system may include an ancillary wash component that is suitable for a platform component as discussed in this disclosure. That is, a wash device 2100 for washing off residual printing material off of a newly 3D-printed part (and platform) may be retrofitted or designed with an aperture 2101 adapted to register with a portion of a platform 1104 of a container assembly or cartridge in accordance with the present invention, thereby exposing the platform 1104 (and the attached 3D-printed object 1107, for example, to an interior chamber where the part may be exposed to a wash module 2102 for applying a solvent and or a light module 2103 for applying a post-curing exposure to post-cure the newly printed 3D-printed part.

Figure 22:
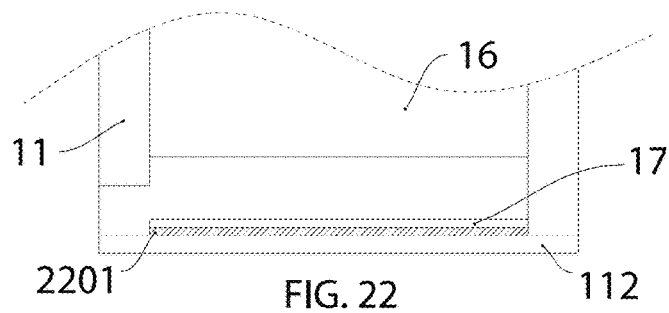
FIG. 22 illustrates an exemplary embodiment of a container assembly, specifically the body of the container assembly, that improves build or printing speed and streamlines the container assembly.

Turning now to the next figure, FIG. 22 illustrates an exemplary embodiment of a container assembly, specifically the body of the container assembly, that improves build or printing speed and streamlines the container assembly. More specifically, this embodiment is similar to the embodiment described with reference to FIG. 3-1 and FIG. 3-2, wherein the baseplate 112 forms the bottom portion of housing or body 11, which is preferably transparent; similarly, baseplate 112 may be, as explained above, substituted by a flexible film. As mentioned above, in exemplary embodiments of the present invention, the flexible film may be disposed over a top surface of the baseplate 112 (e.g., glass) so that the film and the baseplate 112 together form a bottom portion of body 11—this configuration of the hydraulic device results in an increase to the printing speed, but also facilitates transport as a single product (i.e., the container assembly functions as a printing material container, as well as a platform and printing material tank, all in one device or product). However, one potential drawback of this configuration is that disposing the flexible film over the baseplate 112 (e.g., glass) without any means to affix or steadily position the film, can result in an undesired deformation during interaction with fluid and or adherence forces during operation, which may result in the formation of an irregular surface of the film holding the printing material. If this occurs, the deformation may undesirably decrease the accuracy of the 3D-object and may even lead to a printing failure.

Accordingly, FIG. 22 illustrates an exemplary embodiment in which a binding material 2201 is applied between the film 17 and glass 112, so as to fix the film 17 tightly to the glass 112, and further prevent an otherwise creeping deformation. In some exemplary embodiments, the binding material 2201 may be one of a silicone adhesive (e.g., such as a PDMS adhesive), a UV adhesive, or any suitable transparent adhesive capable of affixing film 17 on top of glass 112.

Figures 2, 23:
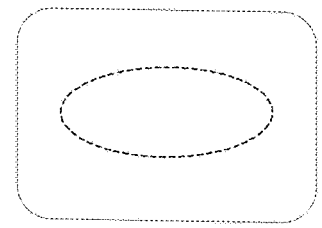
Figures 1, 23:
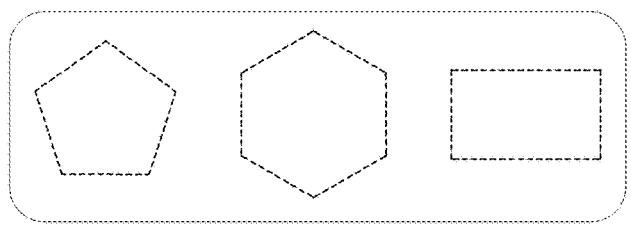
Figures 3, 23:
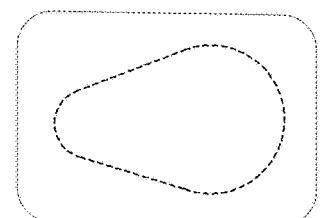
Figures 4, 23:
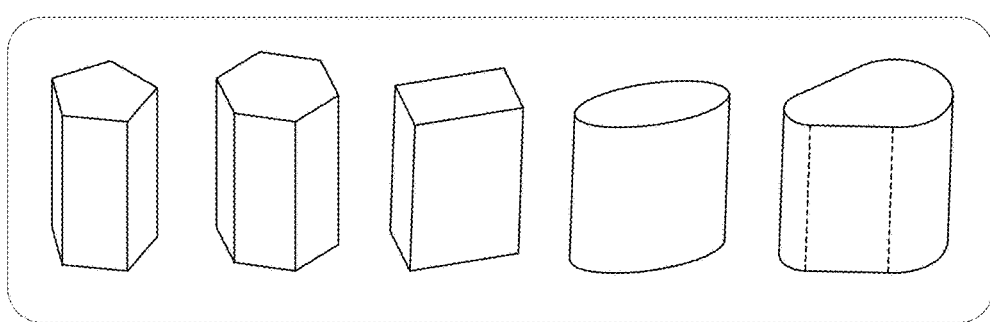
Figures 5, 23:
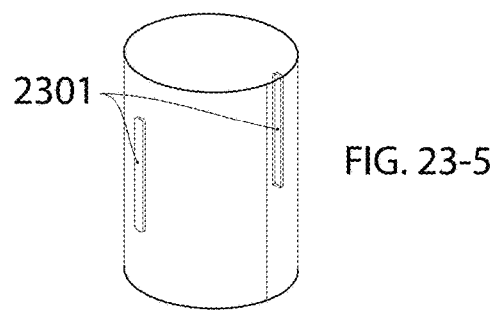

FIG. 23-1 through FIG. 23-4 illustrate exemplary embodiments of pistons, and more specifically different shapes of pistons that may be employed in accordance with the present invention. For example, and in no way limiting the scope of the present invention, the embodiments shown and discussed with reference to FIG. 5 and FIG. 10 show a generally cylindrically shaped piston that forms platform 1004. In some exemplary embodiments, as illustrated by FIG. 23-1 through FIG. 23-3, other shapes may be employed. These other shapes, some polygonal, other oval, rectangular, oblong, or having diverse dimensions such as the shape shown in FIG. 23-2, may provide an advantage of preventing tiny rotations inside the container assembly which may undesirably cause a series of uncontrolled consequences, for example, decrease in 3D-object accuracy or even failed printing altogether.

Accordingly, in some exemplary embodiments, regular prismatic structures may be employed, for example, pentagonal prism, hexagonal prism, tetragonal prism, and the like. Notably, a traditional O-ring seal may be not be suitably employed with these shapes. Similarly, FIG. 23-2 shows a regular prismatic structure also, the terms of "regular" specifically means the cross section is a simple geometric shapes, and the sectional area is easy to calculate; the benefit of this configuration is that a manufacturer may ensure and adjust the relative sectional area conveniently between the first chamber and the second chamber. In FIG. 23-2, an elliptic cylinder piston is provided; this shape is not only useful for preventing an undesired rotation, but it is also adapted to apply a more typical O-ring seal. FIG. 23-3 shows an irregular prismatic structure having a water-drop shape; this shape may be more in line with an ornamental industrial design for a piston in accordance with the present invention. FIG. 23-4 illustrates a series of pistons that complement the cross-sections illustrated in FIG. 23-1 through FIG. 23-3.

FIG. 23-5 illustrates exemplary guiding structures that may be employed in accordance with the present invention. More specifically, this view shows an exemplary guiding structure or structures 2301 that may be disposed or formed on a contact surface between a side wall of a chamber and a piston; this configuration assists in the prevention of an undesirable rotation of the platform. As shown in FIG. 23-5, the guiding structure 2301 may be included as several raised linear ribs on a piston outer surface, and or several linear grooves on the chamber.

Figures 4, 24:
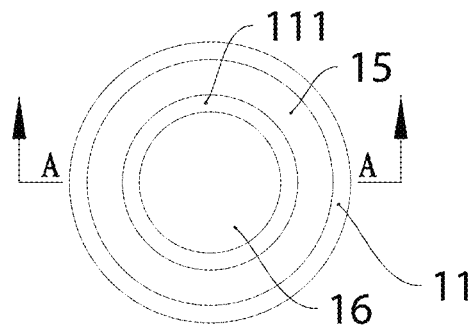
Figures 5, 24:
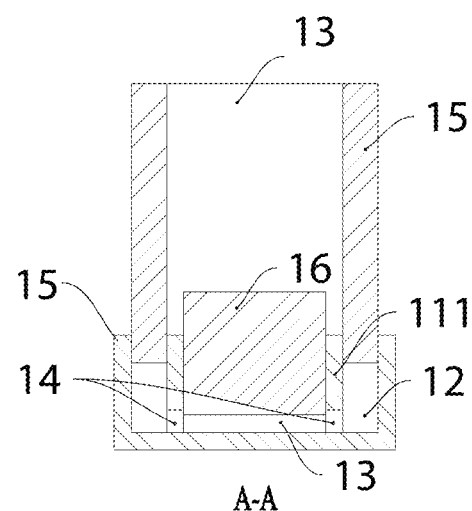
Figures 6, 24:
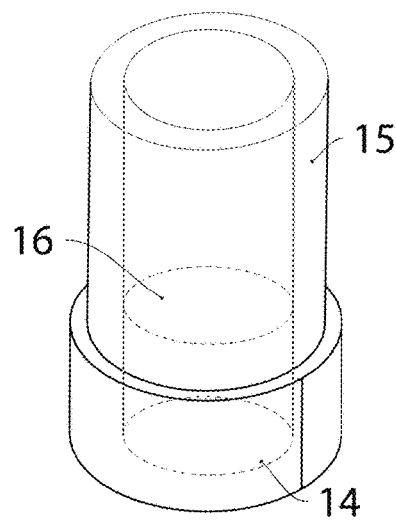
Figures 7, 24:
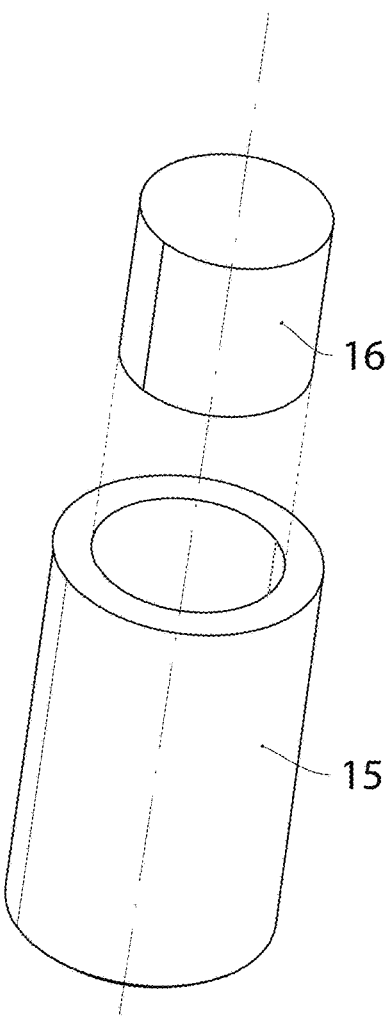
Figures 8, 24:
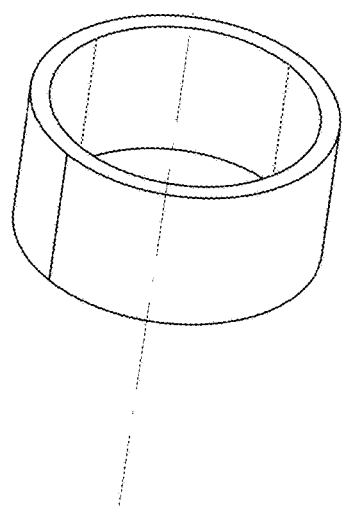
Figures 9, 24:
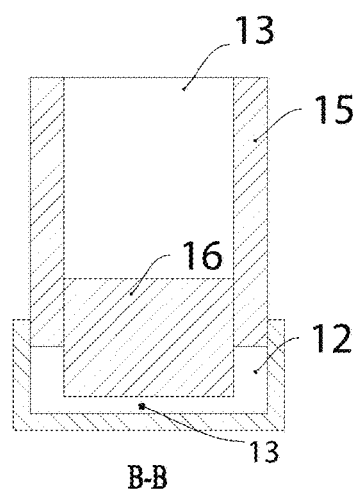

FIG. 24-1 through FIG. 24-3 illustrate a container assembly body configuration in accordance with some exemplar embodiments of the present invention. More specifically, this view shows another embodiment of a container assembly or hydraulic device in accordance with the present invention. In this exemplary embodiment, a platform 16 resides inside of the piston 15, wherein the piston 15 and the platform 16 are concentrically positioned; the piston 15 formed as a hollow cylindrical structure that receives the platform 16 slidably inside. Both the piston 15 and the platform 16 reside inside a housing 11 that houses the entire structure. The body of the hydraulic device is generally a hollow structure, and the hollow area is divided into O-ring shaped chamber 12 (namely a standby resin or printing material chamber) and printing chamber 13 by the divider 111. One or more channels, such as channel 14, may be formed at the bottom of divider 111 to fluidly communicate chamber 12 and chamber 13. In exemplary embodiments, a seal structure as described in embodiments above may be employed, and the platform may have varying shapes as described previously. In some exemplary embodiments, the divider 111 may not be included so that the hollow area may form an undivided chamber; that is, there is no division forming a standby chamber 12 and a printing chamber 13.

Instead, platform 16 may be out of the piston 15, and a 3D-object can be cured beneath the O-ring shaped lower surface of the platform 16. Both the design shown in FIG. 24-1 and FIG. 24-3 are beneficial to reduce the size of the hydraulic device, and allow for the arrangement and use of more devices on a base support (as described with reference to FIG. 20). FIG. 24-4 through FIG. 24-5 illustrate cross-sectional views of the container assembly body configuration in accordance with the embodiment shown in FIG. 24-1. FIG. 24-6 through FIG. 24-9 illustrate a container assembly body configuration in accordance with the embodiment shown in FIG. 24-1, except that this configuration excludes the use of divider 111; instead, the chambers 12 and 13 are formed by tightly positioned piston 15 and platform 16. As with the previous embodiment, chamber 13 can extend to an area or cavity formed between the outer concentric cylinder forming piston 15 and the piston 16 moving along a length of the piston 15 and thus allowing printing material to be transferred into this region or chamber 13 therein.

Figure 25:
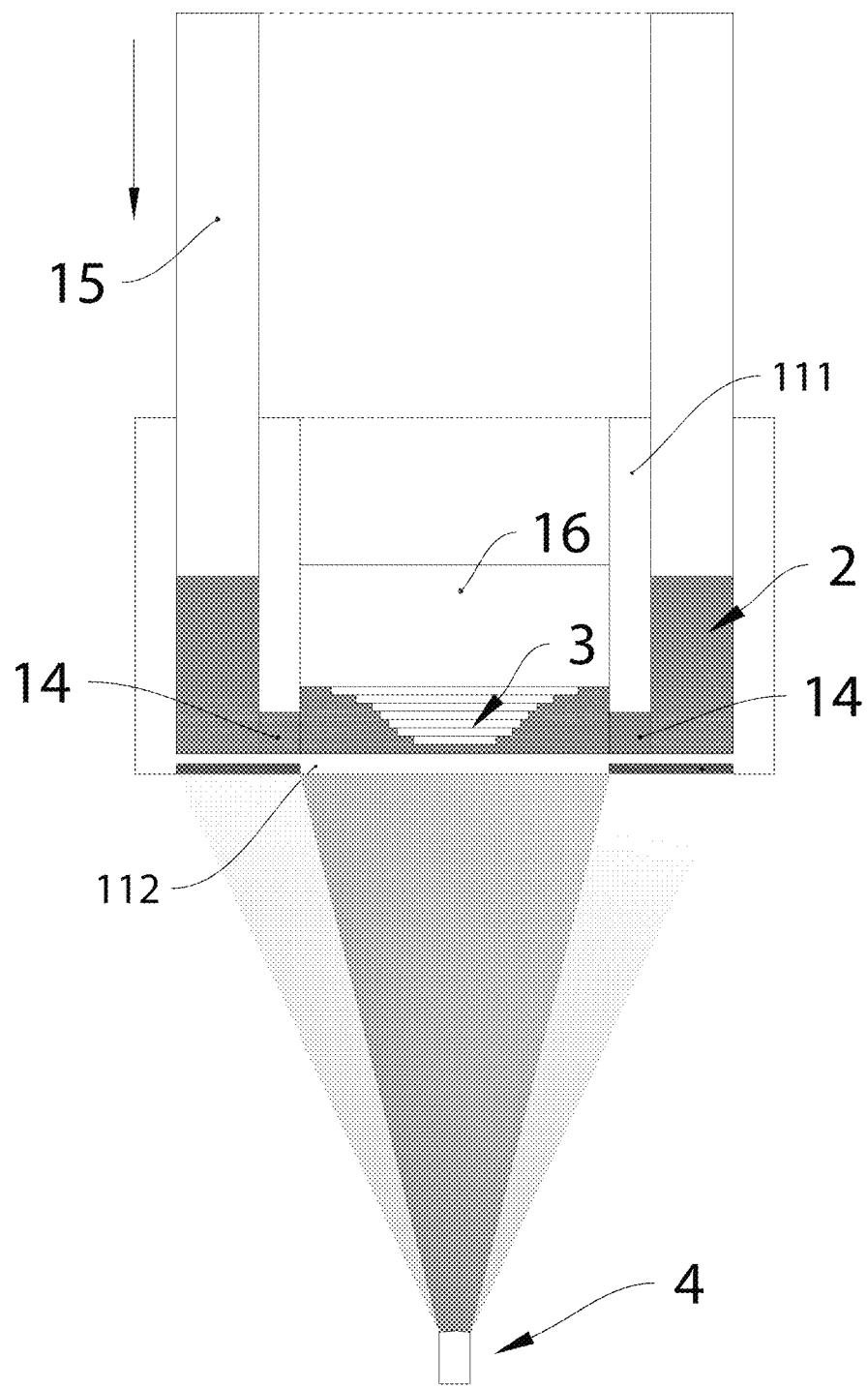
FIG. 25 illustrates a system in accordance with some exemplary embodiments of the present invention similar to the embodiment shown and described with reference to FIG. 24-1.

FIG. 25 illustrates a system in accordance with the exemplary embodiments similar to the embodiments shown and described with reference to FIGS. 24-1-24-2.

A hydraulic 3D-printing system and method has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method for printing three-dimensional objects, comprising the steps of:
    (a) moving a piston inside a chamber of a container assembly, the container assembly adapted to hold one or more printing materials and to print a three-dimensional (3D) object;
    (b) transferring at least a portion of the printing material stored at least partially in the chamber to a printing area between a surface of a window and a platform, wherein movement of the piston inside the chamber hydraulically actuates the platform;
    (c) emitting a curing light through the window to cure a layer of the printing material to the platform or to a previously cured layer of the printing material already cured onto the platform; and
    (d) repeating steps (a)-(c) until the 3D object is formed, wherein moving the piston inside the chamber of the container assembly includes releasing a spring of the container assembly that actuates movement of the piston.

2. The method of claim 1, wherein step (a) includes:
    (a-1) moving the piston in a single direction along an axis of the chamber.

3. The method of claim 2, wherein step (a-1) includes:
    (a-2) continuously moving the piston until the three-dimensional object is formed; or
    (a-3) pausing and continuing movement of the piston at programmable intervals until the three-dimensional object is formed.

4. The method of claim 1, wherein step (b) includes:
    (b-1) disposing the portion of the printing material on a glass surface of the window coated with a gel; or
    (b-2) disposing the portion of the printing material on a film that at least partially forms the window.

5. The method of claim 4, wherein the gel comprises a polydimethylsiloxane (PDMS) layer coating an interior surface of the glass.

6. The method of claim 4, wherein the film is one of: a polydimethylsiloxane (PDMS) film, a polymethyl pentene (PMP) film, a transparent film, or a fluorinated ethylene propylene (FEP) film.

7. The method of claim 1, further comprising:
    (e) releasing the platform from the container assembly to allow access to the 3D object formed on the platform.

8. The method of claim 1, further comprising:
    (f) prior to actuating the piston, breaking or removing a seal of the container assembly.

9. The method of claim 1, wherein:
    the chamber is a first chamber and the piston is a first piston;
    the container assembly includes a second chamber housing the platform; and
    (f) prior to actuating the first piston, breaking or removing a seal of the container assembly that houses the first and second chambers.

10. The method of claim 9, further compromising:
    (g) transferring at least a portion of a second printing material stored in a third chamber to the printing area inside the second chamber, wherein the third chamber is in fluid communication with the second chamber; and
    (h) emitting the curing light through the window to cure a layer of the second printing material to the platform or to a previously cured layer of the printing material or second printing material already cured onto the platform.

11. The method of claim 10, wherein step (g) further comprises:
    (g-1) transferring the portion of the second printing material from the third chamber into the second chamber through a valve.

* * * * *